United States Patent
Okada et al.

(10) Patent No.: US 11,092,788 B2
(45) Date of Patent: Aug. 17, 2021

(54) IMAGING LENS AND IMAGING APPARATUS

(71) Applicant: FUJIFILM Corporation, Tokyo (JP)

(72) Inventors: Kazuyoshi Okada, Saitama (JP); Taro Asami, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 184 days.

(21) Appl. No.: 16/580,645

(22) Filed: Sep. 24, 2019

(65) Prior Publication Data

US 2020/0103634 A1 Apr. 2, 2020

(30) Foreign Application Priority Data

Sep. 28, 2018 (JP) .............................. JP2018-184405

(51) Int. Cl.
| | |
|---|---|
| *G02B 15/177* | (2006.01) |
| *G02B 15/173* | (2006.01) |
| *G02B 13/18* | (2006.01) |
| *G02B 9/64* | (2006.01) |
| *G02B 5/00* | (2006.01) |
| *G02B 13/00* | (2006.01) |

(52) U.S. Cl.
CPC .......... *G02B 15/173* (2013.01); *G02B 13/18* (2013.01); *G02B 15/177* (2013.01); *G02B 5/005* (2013.01); *G02B 9/64* (2013.01); *G02B 13/0045* (2013.01)

(58) Field of Classification Search
CPC ...... G02B 9/64; G02B 13/0045; G02B 13/18; G02B 5/005; G02B 15/177; G02B 15/167

USPC ................ 359/717, 740, 754, 755, 793, 794
See application file for complete search history.

(56) References Cited

U.S. PATENT DOCUMENTS

| | | | |
|---|---|---|---|
| 2014/0268367 A1* | 9/2014 | Kawamura ............ | G02B 13/04 359/708 |
| 2015/0098138 A1* | 4/2015 | Shirasuna ................ | G02B 9/64 359/749 |
| 2017/0269327 A1* | 9/2017 | Mori ........................ | G02B 9/62 |
| 2018/0088299 A1* | 3/2018 | Okada .................... | G02B 13/04 |

FOREIGN PATENT DOCUMENTS

| | | |
|---|---|---|
| JP | 2013-195747 A | 9/2013 |
| JP | 2017-003807 A | 1/2017 |

* cited by examiner

*Primary Examiner* — Evelyn A Lester
(74) *Attorney, Agent, or Firm* — Studebaker & Brackett PC

(57) ABSTRACT

The imaging lens consists of, in order from an object side, a positive first lens group and a positive second lens group. During focusing, the first lens group does not move and the second lens group moves. First and second lenses from an object side in the first lens group are a negative lens. The second lens group consists of a stop disposed on the most object side, two negative lenses, and three or four positive lenses. A lens on the most object side of the second lens group is a negative lens. A lens on the most image side of the second lens group is a positive lens. Predetermined conditional expressions are satisfied.

16 Claims, 15 Drawing Sheets

EXAMPLE 1

EXAMPLE 1

EXAMPLE 3

EXAMPLE 4

EXAMPLE 5

EXAMPLE 6

EXAMPLE 7

IMAGING LENS AND IMAGING APPARATUS

CROSS-REFERENCE TO RELATED APPLICATIONS

The present application claims priority under 35 U.S.C. § 119 to Japanese Patent Application No. 2018-184405, filed on Sep. 28, 2018. The above application is hereby expressly incorporated by reference, in its entirety, into the present application.

BACKGROUND OF THE INVENTION

1. Field of the Invention

The present invention relates to an imaging lens and an imaging apparatus.

2. Description of the Related Art

In recent years, industrial cameras have been widely put to practical use in the fields of a factory automation (FA) and a machine vision (MV). In these cameras, an imaging lens having a focusing function is used frequently. As the known imaging lens having the focusing function in the related art, for example, there are lens systems disclosed in JP2013-195747A and JP2017-003807A. In JP2013-195747A and JP2017-003807A, rear-focusing type lens systems that comprise, in order from an object side, a first lens group and a second lens group which has positive refractive power are disclosed.

SUMMARY OF THE INVENTION

For cameras with restrictions such as installation conditions, it is preferable to be miniaturized, and a rear-focusing type imaging lens that has a lens on the most object side which does not move during focusing tends to be more preferred than a front-focusing type imaging lens. In addition, in an imaging lens, it is required that a variation of field curvature during focusing is low and an incidence angle of a principal light ray on an image plane is small. However, the lens systems disclosed in JP2013-195747A and JP2017-003807A have a large incidence angle of the principal light ray on the image plane.

The present invention has been made in consideration of the above-mentioned situation. An object to be achieved by an embodiment of the present invention is to provide an imaging lens in a rear-focusing type lens system, which achieves miniaturization, suppresses a variation of field curvature during focusing, has a small incidence angle of a principal light ray on an image plane, and has favorable optical performance, and an imaging apparatus comprising the imaging lens.

Specific means for solving the above object include the following aspects.

According to a first aspect of the present invention, there is provided an imaging lens consisting of, in order from an object side to an image side; a first lens group having a positive refractive power, which is fixed with respect to an image plane during focusing, and a second lens group having a positive refractive power, which moves along an optical axis during focusing, in which the first lens group comprises two negative lenses in consecutive order from the most object side to the image side, the second lens group consists of a stop, two negative lenses, and three or four positive lenses, the stop is disposed on the most object side of the second lens group, a lens on the most object side of the second lens group is a negative lens, a lens on the most image side of the second lens group is a positive lens, and in a case where, in a state of focusing on the object at infinity, a distance from an image side principal point of the first lens group, as a reference, to an object side principal point of the second lens group is dH12, a focal length of the first lens group is f1, a distance in an optical axis direction from the object side principal point of the second lens group, as a reference, to the stop is dSt, a focal length of the second lens group is f2, a focal length of the positive lens on the most image side is fp, and regarding dH12 and dSt, each sign of a distance from the reference to the image side is positive and each sign of a distance from the reference to the object side is negative, Conditional Expressions (1), (2) and (3) are satisfied.

$$-2 < dH12/f1 < 0.5 \tag{1}$$

$$-1 < dSt/f2 < -0.6 \tag{2}$$

$$0.4 < f2/fp < 0.8 \tag{3}$$

In the imaging lens according to the first aspect, it is preferable that at least one of Conditional Expression (1-1), (2-1), or (3-1) is satisfied.

$$-1.5 < dH12/f1 < 0.2 \tag{1-1}$$

$$-0.8 < dSt/f2 < -0.7 \tag{2-1}$$

$$0.42 < f2/fp < 0.72 \tag{3-1}$$

In the imaging lens according to the first aspect, in a case where a focal length of the imaging lens in a state of focusing on the object at infinity is f and the focal length of the first lens group is f1, it is preferable that Conditional Expression (4) is satisfied and it is more preferable that Conditional Expression (4-1) is satisfied.

$$0 < f/f1 < 0.5 \tag{4}$$

$$0.25 < f/f1 < 0.45 \tag{4-1}$$

In the imaging lens according to the first aspect, in a case where a distance on the optical axis from a lens surface on the most object side of the first lens group to a lens surface on the most image side of the first lens group is dG1 and the focal length of the first lens group is f1, it is preferable that Conditional Expression (5) is satisfied and it is more preferable that Conditional Expression (5-1) is satisfied.

$$0.5 < dG1/f1 < 1.5 \tag{5}$$

$$0.55 < dG1/f1 < 1.3 \tag{5-1}$$

In the imaging lens according to the first aspect, the number of lenses configuring the first lens group may be four or more and six or less.

In the imaging lens according to the first aspect, in a case where a refractive index of the negative lens on the most object side of the first lens group with respect to d line is n11 and a refractive index of a second negative lens from the object side in the first lens group with respect to d line is n12, it is preferable that Conditional Expression (6) is satisfied and it is more preferable that Conditional Expression (6-1) is satisfied.

$$1.6 < (n11+n12)/2 < 2 \tag{6}$$

$$1.65 < (n11+n12)/2 < 1.98 \tag{6-1}$$

In the imaging lens according to the first aspect, in a case where a refractive index of the negative lens on the most object side of the second lens group with respect to d line is n21, it is preferable that Conditional Expression (7) is satisfied and it is more preferable that Conditional Expression (7-1) is satisfied.

$$1.6 < n21 < 2 \quad (7)$$

$$1.65 < n21 < 1.96 \quad (7\text{-}1)$$

In the imaging lens according to the first aspect, in a case where a radius of curvature of the lens surface on the most image side of the first lens group is rf and a radius of curvature of a lens surface on the most object side of the second lens group is rr, it is preferable that Conditional Expression (8) is satisfied and it is more preferable that Conditional Expression (8-1) is satisfied.

$$-0.5 < (rf-rr)/(rf+rr) < 2.5 \quad (8)$$

$$-0.4 < (rf-rr)/(rf+rr) < 2.2 \quad (8\text{-}1)$$

An imaging apparatus according to a second aspect of the present invention comprises the imaging lens according to the first aspect.

In the present specification, it should be noted that the terms "consisting of ~" and "consists of ~" mean that, in addition to the components listed, a lens that substantially has no refractive power, an optical element, which is not a lens, such as a stop, a filter, and a cover glass, and a mechanism part such as a lens flange, a lens barrel, an imaging element, and a camera shaking correction mechanism may be included.

In the present specification, it should be noted that the term "~ group having a positive refractive power" means that the group has a positive refractive power as a whole. The term "lens having a positive refractive power" and the term "positive lens" are synonymous. The term "lens having a negative refractive power" and the term "negative lens" are synonymous.

The sign of the refractive power, the surface shape of the lens surface, and radius of curvature of a lens including an aspheric surface are considered in terms of the paraxial region unless otherwise noted. Regarding the sign of the radius of curvature, the sign of a radius of curvature of the surface having a shape convex toward the object side is set to be positive, and the sign of the radius of curvature of the surface having a shape convex toward the image side is set to be negative.

The "focal length" used in the conditional expression is a paraxial focal length. The values used in the conditional expressions are values based on the d line in a state of focusing on the object at infinity. The "d line", "C line", and "F line" described in this specification are bright lines, the wavelength of the d line is 587.56 nm (nanometer), the wavelength of the C line is 656.27 nm (nanometer), and the wavelength of the F line is 486.13 nm (nanometer).

According to an embodiment of the present invention, it is possible to provide an imaging lens, in a rear-focusing type lens system, which achieves miniaturization, suppresses a variation of field curvature during focusing, has a small incidence angle of a principal light ray on an image plane, and has favorable optical performance, and an imaging apparatus comprising the imaging lens.

DESCRIPTION OF THE PREFERRED EMBODIMENTS

Figure 1:
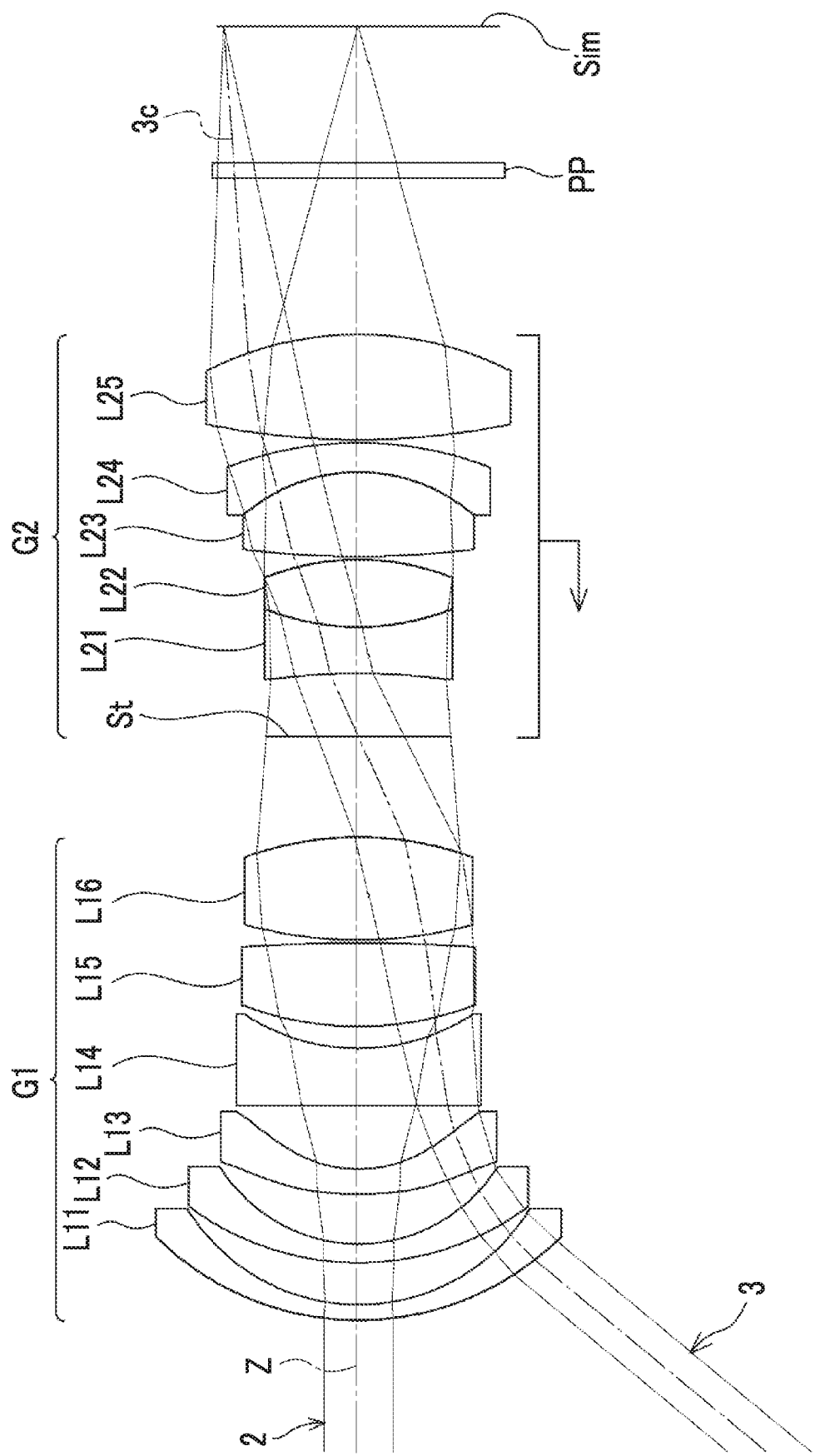
FIG. 1 is a cross-sectional view illustrating a configuration of an imaging lens according to an embodiment of the present invention which corresponds to an imaging lens of Example 1 of the present invention.

Hereinafter, embodiments of an imaging lens of the present invention will be described in detail with reference to the drawings. FIG. 1 is a cross-sectional view illustrating a configuration of an imaging lens according to an embodiment of the present invention. The example shown in FIG. 1 corresponds to an imaging lens of Example 1 to be described later. In FIG. 1, the left side is the object side, the right side is the image side, and a state of focusing on an object at infinity is shown. In addition, an on-axis light flux 2 and a light flux 3 of the maximum image height are also shown as the light flux in FIG. 1.

In FIG. 1, an example is illustrated in which a parallel-plate optical member PP is disposed between an imaging lens and an image plane Sim on the assumption that the imaging lens is applied to the imaging apparatus. The optical member PP is a member assuming various filters, and/or a cover glass or the like. The various filters are, for example, a low pass filter, an infrared ray cut filter, and a filter that cuts a specific wavelength range. The optical member PP is a member having no refractive power, and a configuration in which the optical member PP is omitted is also possible.

The imaging lens consists of, in order from an object side to an image side along an optical axis Z, a first lens group G1 having a positive refractive power, which is fixed with respect to an image plane Sim during focusing, and a second lens group G2 having a positive refractive power, which moves along the optical axis Z during focusing. The imaging lens is a rear-focusing type lens system. In the rear-focusing type, it is advantageous for suppressing a variation of field curvature during focusing. In the example shown in FIG. 1, the second lens group G2 moves to the object side during focusing from the object at infinity to the closest object. An arrow directed in the left direction under the second lens group G2 shown in FIG. 1 indicates a behavior of the second lens group G2 during focusing.

As an example, the imaging lens shown in FIG. 1 consists of the first lens group G1 and the second lens group G2. The first lens group G1 consists of six lenses L11 to L16, in order from the object side to the image side, and the second lens group G2 consists of an aperture stop St and five lenses L21 to L25, in order from the object side to the image side. However, as shown in the examples to be described later, the number of lenses configuring each lens group can be different from the number shown in FIG. 1. In addition, the aperture stop St shown in FIG. 1 does not indicate a shape thereof but indicates a position thereof on the optical axis.

The first lens group G1 is configured to have two negative lenses in consecutive order from the most object side to the image side. With the configuration, it is advantageous for suppressing fifth-order or more distortion.

The number of lenses configuring the first lens group G1 may be four or more and six or less. By setting the number of lenses configuring the first lens group G1 to four or more, it becomes easy to achieve favorable correction of aberration. By setting the number of lenses configuring the first lens group G1 to 6 or less, it is advantageous for reducing the overall length of the lens system and the diameter of the lens.

For example, the first lens group G1 may be configured to consist of four negative lenses and two positive lenses, may be configured to consist of three negative lenses and three positive lenses, may be configured to consist of three negative lenses and two positive lenses, or may be configured to consist of two negative lenses and two positive lenses.

The second lens group G2 is configured to consist of the aperture stop St, two negative lenses, and three or four positive lenses. By allowing the aperture stop St to move during focusing, it is advantageous for reducing an incidence angle of a principal light ray on the image plane Sim. In addition, by allowing the aperture stop St to move during focusing, it is advantageous for suppressing the variation of field curvature during focusing. By setting the number of negative lenses included in the second lens group G2 to two, it becomes easy to correct longitudinal chromatic aberration and lateral chromatic aberration. By setting the number of positive lenses included in the second lens group G2 to three or four, it is possible to curve light ray gradually and suppress the occurrence of aberration. The second lens group G2 includes two negative lenses and three or four positive lenses such that it is advantageous for suppressing the variation of field curvature during focusing. By setting the number of lenses included in the second lens group G2 to the above-described number of the lenses, it is possible to prevent the overall length of the lens system from being too long.

The second lens group G2 is configured such that the aperture stop St is disposed on the most object side of the second lens group G2, a lens on the most object side of the second lens group G2 is a negative lens, and a lens on the most image side of the second lens group G2 is a positive lens. By disposing the aperture stop St on the most object side in the second lens group G2, it is advantageous for reducing the incidence angle of the principal light ray on the image plane Sim. In addition, by setting the lens on the most object side of the second lens group G2 to be a negative lens, it is possible to make a back focus long and to position exit pupil far from the image plane Sim, as a result, it is advantageous for reducing the incidence angle of the principal light ray on the image plane Sim. By setting the lens on the most image side of the second lens group G2 to be a positive lens, it is advantageous for reducing the incidence angle of the principal light ray on the image plane Sim.

The second lens group G2 may be configured to include a cemented lens cementing a positive lens and a negative lens. In this case, it is advantageous for correcting chromatic aberration. Second and third lenses from the image side of the second lens group G2 have refractive power of different sign with each other and may have a configuration to be cemented with each other. In this case, since the cemented lens consisting of a positive lens and a negative lens is relatively disposed close to the image plane Sim, it is advantageous for correcting lateral chromatic aberration. In a case where the cemented lens has a positive refractive power as a whole, it is advantageous for reducing the incidence angle of the principal light ray on the image plane Sim while correcting the lateral chromatic aberration favorably.

Next, the configuration with respect to the conditional expressions will be described. The imaging lens is configured to satisfy Conditional Expression (1) in a case where, in a state of focusing on the object at infinity, a distance from a reference which is an image side principal point of the first lens group G1 to an object side principal point of the second lens group G2 is dH12 and the focal length of the first lens group G1 is f1. However, regarding dH12, the sign of a distance from the reference to the image side is positive and the sign of a distance from the reference to the object side is negative. By not allowing the result of Conditional Expression (1) to be equal to or less than the lower limit, it is possible to prevent the overall length of the lens system from being too long. By not allowing the result of Conditional Expression (1) to be equal to or greater than the upper limit, it is advantageous for making the back focus long. By satisfying Conditional Expression (1), it is advantageous for increasing a distance from a position of the exit pupil to the image plane Sim in a state of maintaining the position of the exit pupil fixed while suppressing the lens system to become large, as a result, it becomes easy to realize an imaging lens which has a small incidence angle of the principal light ray on the image plane Sim and which is configured to be miniaturized. Furthermore, in a case of a configuration in which Conditional Expression (1-1) is satisfied, it is possible to obtain more favorable characteristics.

$$-2<dH12/f1<0.5 \tag{1}$$

$$-1.5<dH12/f1<0.2 \tag{1-1}$$

The imaging lens is configured to satisfy Conditional Expression (2) in a case where a distance in an optical axis direction from a reference which is an object side principal point of the second lens group G2 to the aperture stop St is dSt and the focal length of the second lens group G2 is f2. However, regarding dSt, the sign of a distance from the reference to the image side is positive and the sign of a distance from the reference to the object side is negative. As dSt/f2 of Conditional Expression (2) approaches −1, the incidence angle of the principal light ray on the image plane Sim can have a value close to 0, but the diameter of lenses on the image side tends to be large. By not allowing the result of Conditional Expression (2) to be equal to or less than the lower limit, it is possible to suppress the lenses on the image side to become large. By not allowing the result of Conditional Expression (2) to be equal to or greater than the upper limit, it is possible to suppress the incidence angle of the principal light ray on the image plane Sim to be increased. By satisfying Conditional Expression (2), it becomes easy to reduce the incidence angle of the principal light ray on the image plane Sim while suppressing the lenses to become large. Furthermore, in a case of a configuration in which Conditional Expression (2-1) is satisfied, it is possible to obtain more favorable characteristics.

$$-1<dSt/f2<-0.6 \quad (2)$$

$$-0.8<dSt/f2<-0.7 \quad (2\text{-}1)$$

In addition, the imaging lens is configured to satisfy Conditional expression (3) in a case where the focal length of the second lens group G2 is f2 and the focal length of a positive lens on the most image side is fp. By not allowing the result of Conditional Expression (3) to be equal to or less than the lower limit, it is advantageous for reducing the incidence angle of the principal light ray on the image plane Sim. By not allowing the result of Conditional Expression (3) to be equal to or greater than the upper limit, it becomes easy to suppress astigmatism and fifth-order spherical aberration. Furthermore, in a case of a configuration in which Conditional Expression (3-1) is satisfied, it is possible to obtain more favorable characteristics.

$$0.4<f2/fp<0.8 \quad (3)$$

$$0.42<f2/fp<0.72 \quad (3\text{-}1)$$

The imaging lens consists of the first lens group G1 and the second lens group G2, which has the above-mentioned configuration, and by simultaneously satisfying Conditional Expression (1), (2), and (3), it is advantageous for making the imaging lens miniaturized, for suppressing the variation of field curvature during focusing, for reducing the incidence angle of the principal light ray on the image plane Sim, and for realizing favorable optical performance.

Furthermore, in the imaging lens, in a case where the focal length of the imaging lens in a state of focusing on the object at infinity is f and the focal length of the first lens group G1 is f1, it is preferable that Conditional Expression (4) is satisfied. By not allowing the result of Conditional Expression (4) to be equal to or less than the lower limit, it is advantageous for reducing the incidence angle of the principal light ray on the image plane Sim. By not allowing the result of Conditional Expression (4) to be equal to or greater than the upper limit, it is possible to suppress the occurrence of aberration. Furthermore, in a case of a configuration in which Conditional Expression (4-1) is satisfied, it is possible to obtain more favorable characteristics.

$$0<f/f1<0.5 \quad (4)$$

$$0.25<f/f1<0.45 \quad (4\text{-}1)$$

In addition, in the imaging lens, in a case where a distance on the optical axis from a lens surface on the most object side of the first lens group G1 to a lens surface on the most image side of the first lens group G1 is dG1 and the focal length of the first lens group G1 is f1, it is preferable that Conditional Expression (5) is satisfied. By not allowing the result of Conditional Expression (5) to be equal to or less than the lower limit, it is advantageous for securing a capability of correction of aberration by the first lens group G1 to realize favorable optical performance. By not allowing the result of Conditional Expression (5) to be equal to or greater than the upper limit, lenses on the object side can be prevented from being large since a length of an optical system in the optical axis direction on the object side from the aperture stop St is prevented from being too long. Furthermore, in a case of a configuration in which Conditional Expression (5-1) is satisfied, it is possible to obtain more favorable characteristics.

$$0.5<dG1/f1<1.5 \quad (5)$$

$$0.55<dG1/f1<1.3 \quad (5\text{-}1)$$

In addition, in the imaging lens, in a case where a refractive index of the negative lens on the most object side of the first lens group G1 with respect to d line is n11 and a refractive index of a second negative lens from the object side in the first lens group G1 with respect to d line is n12, it is preferable that Conditional Expression (6) is satisfied. By not allowing the result of Conditional Expression (6) to be equal to or less than the lower limit, it is advantageous for miniaturization. Considering the distribution of refractive index and Abbe number of existing optical materials, by not allowing the result of Conditional Expression (6) to be equal to or greater than the upper limit, it is advantageous for suppressing lateral chromatic aberration since it is possible to configure the lens such that Abbe number of the lens is not too low. Furthermore, in a case of a configuration in which Conditional Expression (6-1) is satisfied, it is possible to obtain more favorable characteristics.

$$1.6<(n11+n12)/2<2 \quad (6)$$

$$1.65<(n11+n12)/2<1.98 \quad (6\text{-}1)$$

In addition, in the imaging lens, in a case where a refractive index of the negative lens on the most object side of the second lens group G2 with respect to d line is n21, it is preferable that Conditional Expression (7) is satisfied. By not allowing the result of Conditional Expression (7) to be equal to or less than the lower limit, it is possible to use a material having a high refractive index for the lens. A lens having a low refractive index tends to increase the occurrence frequency of fifth-order spherical aberration in a case of correcting third-order spherical aberration to be suppressed. By not allowing the result of Conditional Expression (7) to be equal to or less than the lower limit, it is advantageous for suppressing fifth-order spherical aberration while suppressing third-order spherical aberration, and for reducing the incidence angle of the principal light ray on the image plane Sim. By not allowing the result of Conditional Expression (7) to be equal to or greater than the upper limit, it is possible to contribute to suppressing third-order spherical aberration. Furthermore, in a case of a configuration in which Conditional Expression (7-1) is satisfied, it is possible to obtain more favorable characteristics.

$$1.6<n21<2 \quad (7)$$

$$1.65<n21<1.96 \quad (7\text{-}1)$$

In addition, in the imaging lens, in a case where a radius of curvature of the lens surface on the most image side of the first lens group G1 is rf and a radius of curvature of a lens surface on the most object side of the second lens group G2 is rr, it is preferable that Conditional Expression (8) is satisfied. Conditional Expression (8) is an expression with respect to a shape factor of an air lens which is formed by two lens surfaces between which the aperture stop St is put to face each other. By satisfying Conditional Expression (8), it is possible to suppress coma aberration. Furthermore, in a case of a configuration in which Conditional Expression (8-1) is satisfied, it is possible to obtain more favorable characteristics.

$$-0.5<(rf-rr)/(rf+rr)<2.5 \quad (8)$$

$$-0.4<(rf-rr)/(rf+rr)<2.2 \quad (8\text{-}1)$$

The above-mentioned preferable configurations and available configurations may be optionally combined, and it is preferable to selectively adopt the configurations in accordance with the required specification as appropriate. According to the technology of the present invention, it is possible to realize an imaging lens, in the rear-focusing type lens system, which achieves miniaturization, suppresses a variation of field curvature during focusing, has a small incidence angle of a principal light ray on an image plane Sim, and has favorable optical performance Herein, the imaging lens having a small incidence angle of the principal light ray on the image plane Sim means an imaging lens in which an angle between the principal light ray 3c of the maximum image height incident on the image plane Sim and an axis parallel to the optical axis Z is 6 degrees or less.

Next, numerical examples of the imaging lens of the embodiment of the present invention will be described.

EXAMPLE 1

A cross-sectional view illustrating the configuration of an imaging lens of Example 1 is shown in FIG. 1, and since the illustration method and the configuration thereof are as described above, part of redundant explanation will be omitted herein. The imaging lens of Example 1 consists of, in order from the object side to the image side, a first lens group G1 having a positive refractive power and a second lens group G2 having a positive refractive power. During focusing from the object at infinity to a closest object, the first lens group G1 is fixed with respect to the image plane Sim and the second lens group G2 moves to the object side along the optical axis Z. The first lens group G1 consists of six lenses L11 to L16 in order from the object side to the image side. The second lens group G2 consists of the aperture stop St and five lenses L21 to L25 in order from the object side to the image side. The above is the outline of the imaging lens of Example 1.

Regarding the imaging lens of Example 1, Table 1 shows basic lens data, Table 2 shows specifications, Table 3 shows variable surface distances, and Table 4 shows aspherical coefficients. In Table 1, the column of Sn shows surface numbers, where the surface on the most object side is the first surface and the surface number increases one by one toward the image side. The column of R shows radii of curvature of the respective surfaces. The column of D shows surface distances on the optical axis between each surface and the adjacent surface on the image side. Further, the column of Nd shows refractive indices of the respective components at the d line and the column of vd shows Abbe numbers of the respective components based on the d line.

In Table 1, the sign of a radius of curvature of the surface having a shape convex toward the object side is set to be positive, and the sign of the radius of curvature of the surface having a shape convex toward the image side is set to be negative. In Table 1, the optical member PP and the aperture stop St are also illustrated, and the surface number and a term of (St) are noted in a place of the surface number of a surface corresponding to the aperture stop St. A value in the bottom of the column of D in Table 1 indicates a distance between the image plane Sim and the surface on the most image side in the table. In Table 1, the symbol DD [ ] is used for a variable surface distance in which the distance changes during focusing, and the surface number of the object side of this distance is added in [ ] and noted in the column of D.

In Table 2, values of the focal length f of the imaging lens, the back focus Bf in an air conversion length, the F number FNo., the maximum total angle of view 2ω, the maximum image height Y, and the incidence angle CRA of the principal light ray 3c at the maximum image height Y incident on the image plane Sim are shown based on the d line. (°) in the column of 2ω and CRA indicates that the unit thereof is a degree. The values shown in Table 2 are values based on the d line in a state of focusing on the object at infinity.

In Table 3, values of the variable surface distance in a state of focusing on the object at infinity is shown in the column of "infinity", and values of the variable surface distance in a state of focusing on an object at an object distance of 0.1 m (meter) is shown in the columns of "0.1 m".

In Table 1, the sign * is attached to the surface number of the aspheric surface, and the numerical value of the paraxial radius of curvature is written in the column of the radius of curvature of the aspheric surface. In Table 4, the row of Sn shows the surface number of the aspheric surface, and the rows of KA and Am (m=3, 4, 5, ... 20) show the numerical values of the aspherical coefficients for each aspheric surface. The "E±n" (n: an integer) in numerical values of the aspherical coefficients of Table 4 indicates "×10$^{\pm n}$". KA and Am are the aspherical coefficients in the aspheric expression represented by following expression.

$$Zd = C \times h^2 / \{1 + (1 - KA \times C^2 \times h^2)^{1/2}\} + \Sigma Am \times h^m$$

where,

Zd: Aspheric depth (the length of a perpendicular drawn to a plane perpendicular to the optical axis with which the aspherical vertex contacts, from a point on the aspherical surface of the height h)

h: Height (the distance from the optical axis to the lens surface)

C: Inverse of the paraxial radius of curvature

KA, Am: Aspherical coefficient

Σ in an aspheric expression means the sum with respect to m.

In data of each table, a degree is used as a unit of an angle, and mm (millimeter) is used as a unit of a length, but appropriate different units may be used since the optical system can be used even in a case where the system is enlarged or suppressed in proportion. Further, each of following tables shows numerical values rounded off to predetermined decimal places.

TABLE 1

| Example 1 | | | | |
| --- | --- | --- | --- | --- |
| Sn | R | D | Nd | vd |
| 1 | 19.01414 | 0.990 | 1.95375 | 32.32 |
| 2 | 13.21044 | 2.690 | | |
| 3 | 18.80483 | 1.210 | 1.91083 | 35.26 |
| 4 | 10.76444 | 3.190 | | |
| *5 | 28.42070 | 1.600 | 1.58135 | 59.40 |
| *6 | 9.40102 | 4.030 | | |
| 7 | ∞ | 3.630 | 1.48749 | 70.42 |
| 8 | 13.75262 | 1.410 | | |
| 9 | 21.79808 | 5.330 | 1.60342 | 38.01 |
| 10 | −113.93623 | 0.200 | | |
| 11 | 28.52005 | 6.580 | 1.62005 | 36.35 |
| 12 | −21.98843 | DD[12] | | |

TABLE 1-continued

Example 1

| Sn | R | D | Nd | vd |
|---|---|---|---|---|
| 13 (St) | ∞ | 4.060 | | |
| 14 | −42.07139 | 2.970 | 1.95375 | 32.32 |
| 15 | 16.61900 | 4.310 | 1.53775 | 74.70 |
| 16 | −16.61900 | 0.200 | | |
| 17 | 61.56997 | 5.400 | 1.53775 | 74.70 |
| 18 | −11.58900 | 1.880 | 1.91083 | 35.26 |
| 19 | −23.92552 | 0.200 | | |
| 20 | 49.91389 | 6.670 | 1.48749 | 70.42 |
| 21 | −22.23213 | DD[21] | | |
| 22 | ∞ | 1.000 | 1.51680 | 64.20 |
| 23 | ∞ | 8.733 | | |

TABLE 2

Example 1

| | |
|---|---|
| f | 8.307 |
| Bf | 19.392 |
| FNo. | 1.85 |
| 2ω(°) | 105.2 |
| Y | 9.20 |
| CRA(°) | 4.7 |

TABLE 3

Example 1

| | Infinity | 0.1 m |
|---|---|---|
| DD[12] | 6.430 | 5.776 |
| DD[21] | 10.000 | 10.654 |

TABLE 4

Example 1

| Sn | 5 | 6 |
|---|---|---|
| KA | 1.0000000E+00 | 1.0000000E+00 |
| A3 | −1.2046691E−18 | 2.2888713E−17 |
| A4 | 9.3019521E−04 | 1.1123324E−03 |
| A5 | −2.6660648E−04 | −4.1617168E−04 |
| A6 | 5.9261740E−05 | 8.4465890E−05 |
| A7 | −5.6476448E−06 | −2.2416834E−06 |
| A8 | −1.2576443E−06 | −2.5102331E−06 |
| A9 | 3.1331558E−07 | 1.6018785E−07 |
| A10 | 9.9773850E−09 | 6.0424532E−08 |
| A11 | −8.1092582E−09 | −5.1746091E−09 |
| A12 | 2.7716769E−10 | −8.3613188E−10 |
| A13 | 1.1227093E−10 | 7.7626188E−11 |
| A14 | −7.6256237E−12 | 7.1833497E−12 |
| A15 | −8.6296256E−13 | −6.2029402E−13 |
| A16 | 7.7451525E−14 | −4.0573836E−14 |
| A17 | 3.4697903E−15 | 2.5548125E−15 |
| A18 | −3.6855671E−16 | 1.4947384E−16 |
| A19 | −5.6936564E−18 | −4.2753154E−18 |
| A20 | 6.8283373E−19 | −2.7343114E−19 |

Figure 8:
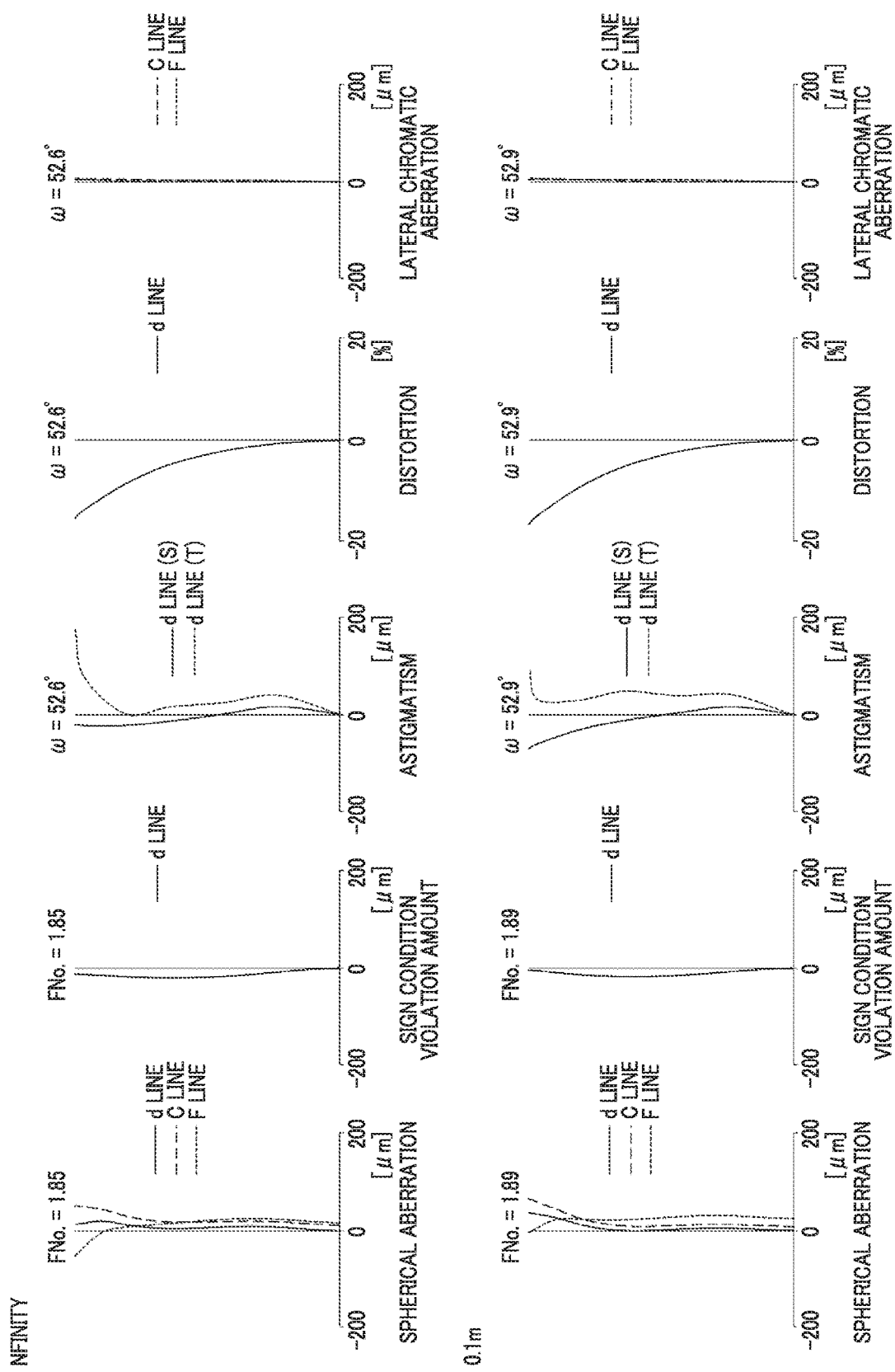
FIG. 8 is aberration diagrams of the imaging lens of Example 1 of the present invention.

Each aberration diagram of the imaging lens of Example 1 is shown in FIG. 8. FIG. 8 shows spherical aberration, sine condition violation amount, astigmatism, distortion, and lateral chromatic aberration in order from the left side. In FIG. 8, aberration diagrams in a state of focusing on the object at infinity are shown in the upper row with "infinity", and aberration diagrams in a state of focusing on an object at an object distance of 0.1 m (meter) are shown in the lower row with "0.1 m". In the spherical aberration diagram, aberrations at the d line, the C line, and the F line are respectively indicated by a solid line, a long dashed line, and a short dashed line. In the astigmatism diagram, aberration in the sagittal direction at the d line is indicated by a solid line, and aberration in the tangential direction at the d line is indicated by a short dashed line. In the distortion diagram and the sine condition violation amount diagram, aberration at the d line is indicated by a solid line. In the lateral chromatic aberration diagram, aberrations at the C line and the F line are respectively indicated by a long dashed line and a short dashed line. In the spherical aberration diagram and the sine condition violation amount diagram, FNo. indicates an F number and in other aberration diagrams, ω indicates half angle of view.

The symbols, the meanings, the description method, and the illustration method of each data item relating to Example 1 are the same in following Examples unless otherwise specified, and thus descriptions thereof will not be repeated below.

EXAMPLE 2

Figure 2:
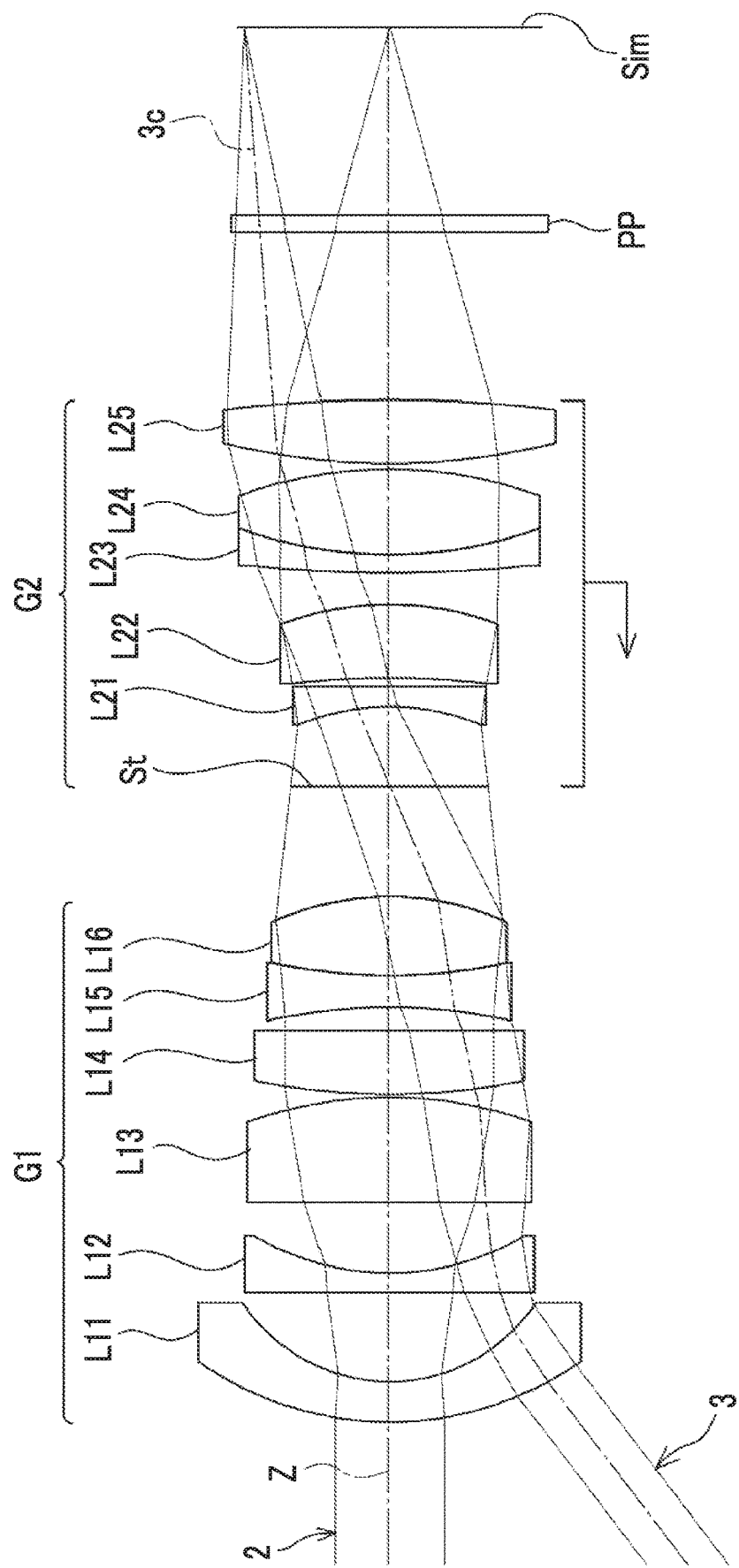
FIG. 2 is a cross-sectional view illustrating a configuration of an imaging lens of Example 2 of the present invention.
Figure 9:
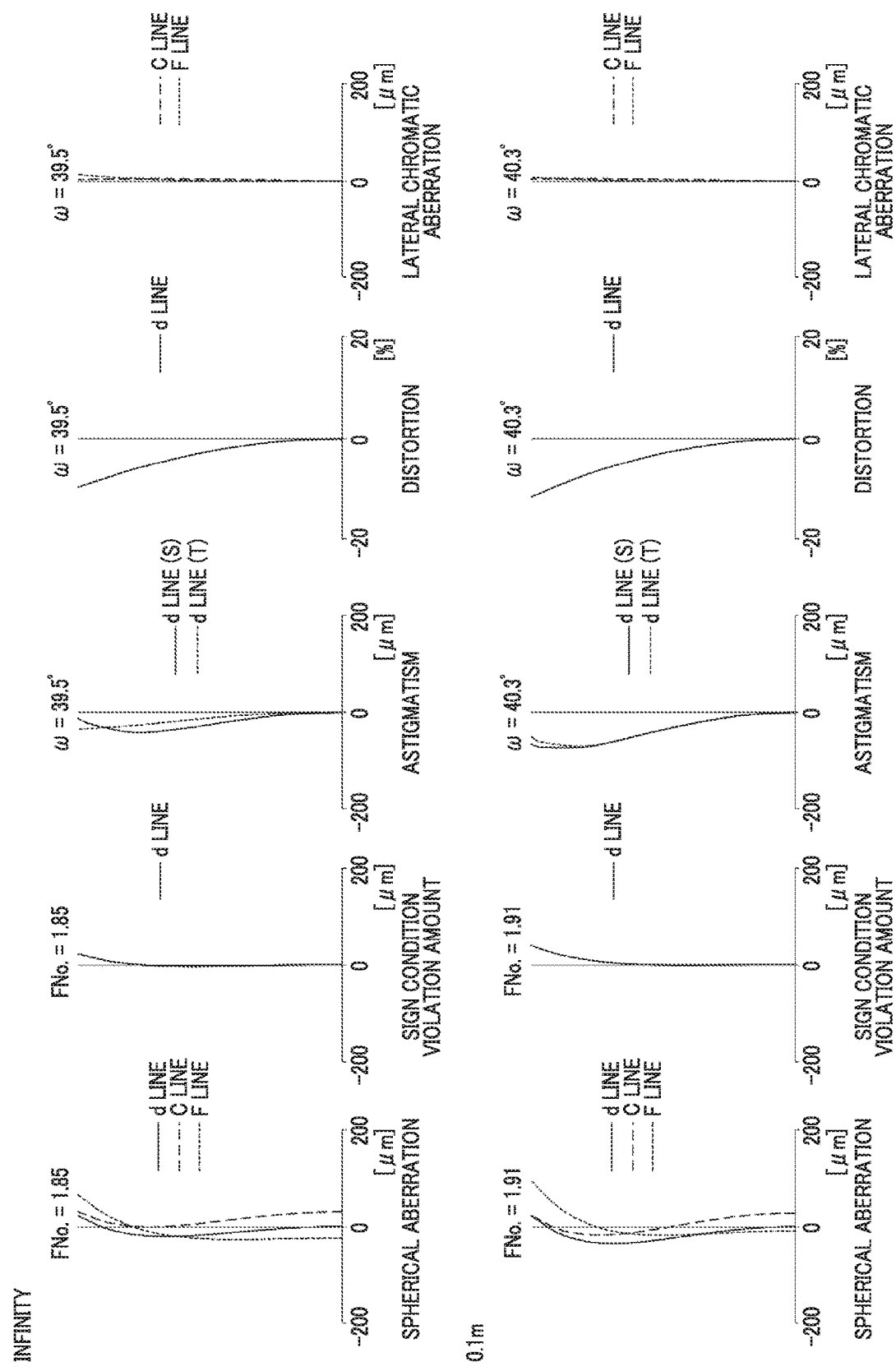
FIG. 9 is aberration diagrams of the imaging lens of Example 2 of the present invention.

FIG. 2 is a cross-sectional view illustrating a configuration of an imaging lens of Example 2. The imaging lens of Example 2 has the same configuration as the outline of the imaging lens of Example 1. Regarding the imaging lens of Example 2, Table 5 shows basic lens data, Table 6 shows specifications, Table 7 shows variable surface distances, and FIG. 9 shows each aberration diagram. In FIG. 9, aberration diagrams in a state of focusing on the object at infinity are shown in the upper row, and aberration diagrams in a state of focusing on an object at an object distance of 0.1 m (meter) are shown in the lower row.

TABLE 5

Example 2

| Sn | R | D | Nd | vd |
|---|---|---|---|---|
| 1 | 20.41445 | 2.420 | 2.00100 | 29.13 |
| 2 | 10.76445 | 5.340 | | |
| 3 | ∞ | 1.170 | 1.62280 | 56.91 |
| 4 | 16.39544 | 4.230 | | |
| 5 | ∞ | 6.220 | 1.72825 | 28.31 |
| 6 | −26.19033 | 0.200 | | |
| 7 | 42.58435 | 3.820 | 1.92287 | 18.90 |
| 8 | ∞ | 1.350 | | |
| 9 | −35.83706 | 1.910 | 1.90366 | 31.42 |
| 10 | 33.35000 | 4.730 | 1.71300 | 53.87 |
| 11 | −17.36773 | DD[11] | | |
| 12 (St) | ∞ | 4.750 | | |
| 13 | −14.93706 | 1.230 | 1.84667 | 23.79 |
| 14 | ∞ | 0.500 | | |
| 15 | −52.58636 | 4.410 | 1.83481 | 42.73 |
| 16 | −19.12775 | 1.910 | | |
| 17 | 87.44098 | 1.080 | 1.84667 | 23.79 |
| 18 | 27.16700 | 5.080 | 1.49700 | 81.59 |
| 19 | −27.16700 | 0.360 | | |
| 20 | 42.67084 | 3.780 | 1.85151 | 40.73 |
| 21 | −88.73563 | DD[21] | | |
| 22 | ∞ | 1.000 | 1.51680 | 64.20 |
| 23 | ∞ | 11.260 | | |

TABLE 6

Example 2

| | |
|---|---|
| f | 12.371 |
| Bf | 21.919 |
| FNo. | 1.85 |
| 2ω(°) | 79.0 |

TABLE 6-continued

| Example 2 | | |
|---|---|---|
| Y | | 9.20 |
| CRA(°) | | 4.7 |

TABLE 7

| Example 2 | | |
|---|---|---|
| | Infinity | 0.1 m |
| DD[11] | 6.600 | 5.062 |
| DD[21] | 10.000 | 11.538 |

EXAMPLE 3

Figure 3:
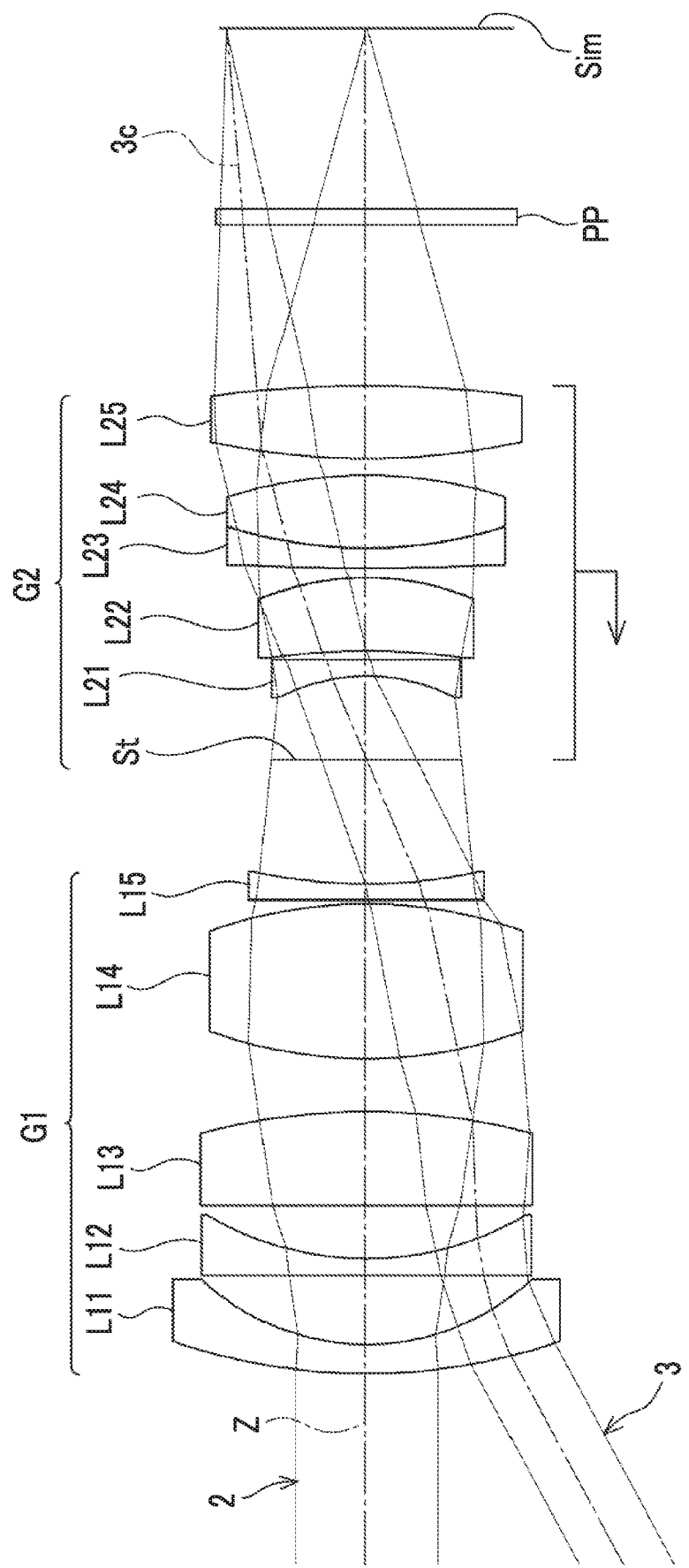
FIG. 3 is a cross-sectional view illustrating a configuration of an imaging lens of Example 3 of the present invention.
Figure 10:
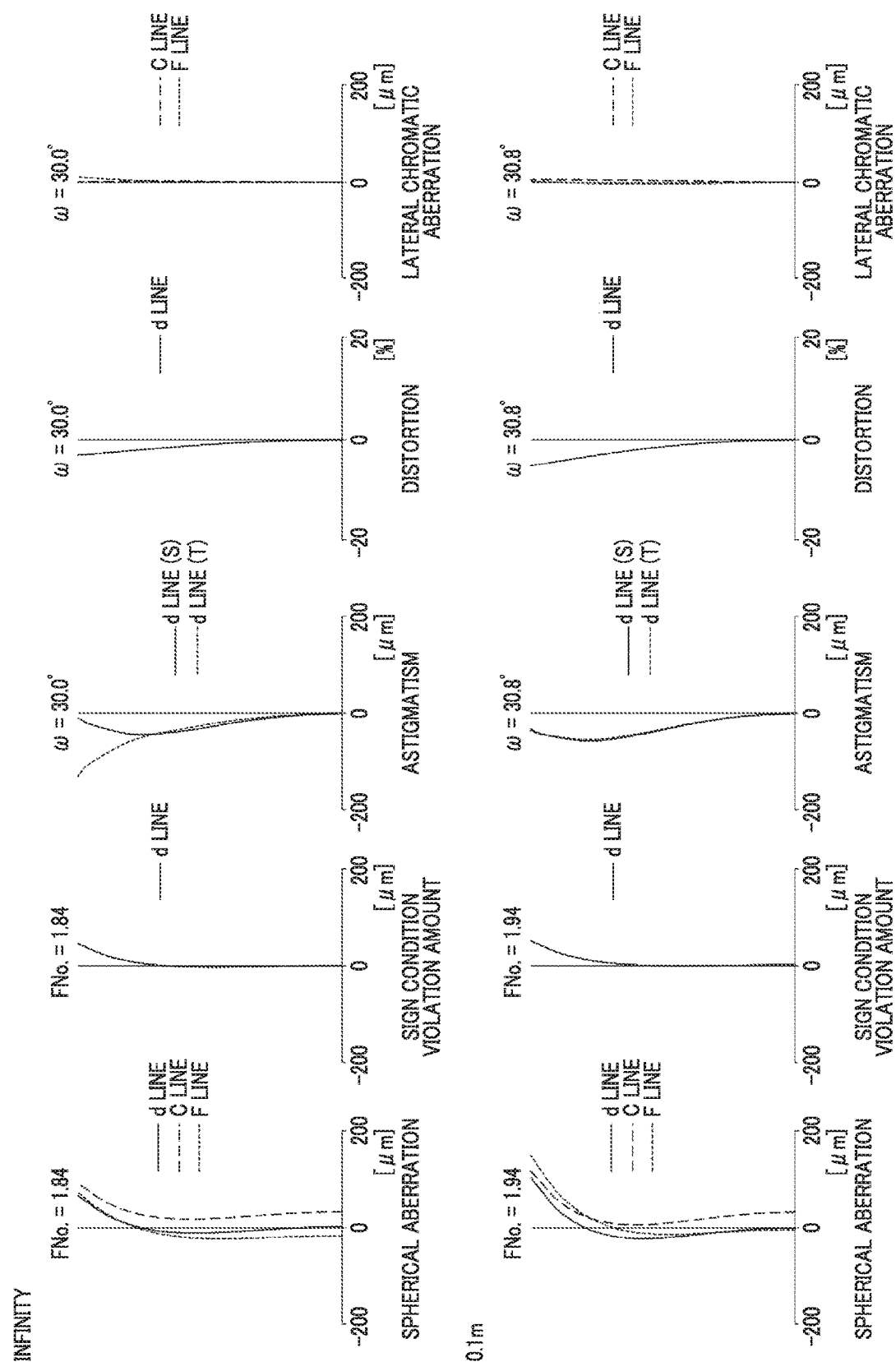
FIG. 10 is aberration diagrams of the imaging lens of Example 3 of the present invention.

FIG. 3 is a cross-sectional view illustrating a configuration of an imaging lens of Example 3. The imaging lens of Example 3 has the same configuration as the outline of the imaging lens of Example 1 except that the first lens group G1 consists of five lenses L11 and L15 in order from the object side to the image side. Regarding the imaging lens of Example 3, Table 8 shows basic lens data, Table 9 shows specifications, Table 10 shows variable surface distances, and FIG. 10 shows each aberration diagram. In FIG. 10, aberration diagrams in a state of focusing on the object at infinity are shown in the upper row, and aberration diagrams in a state of focusing on an object at an object distance of 0.1 m (meter) are shown in the lower row.

TABLE 8

| Example 3 | | | | |
|---|---|---|---|---|
| Sn | R | D | Nd | νd |
| 1 | 38.16230 | 1.810 | 1.85151 | 40.73 |
| 2 | 15.45359 | 4.300 | | |
| 3 | ∞ | 1.000 | 1.48749 | 70.42 |
| 4 | 19.96225 | 3.310 | | |
| 5 | ∞ | 5.770 | 1.90366 | 31.42 |
| 6 | −41.01353 | 3.300 | | |
| 7 | 29.60975 | 9.580 | 1.71300 | 53.87 |
| 8 | −29.60975 | 0.240 | | |
| 9 | ∞ | 1.000 | 1.62589 | 35.71 |
| 10 | 33.39281 | DD[10] | | |
| 11 (St) | ∞ | 5.200 | | |
| 12 | −12.32758 | 1.000 | 1.69895 | 30.05 |
| 13 | ∞ | 0.560 | | |
| 14 | −43.45462 | 4.570 | 1.80401 | 46.57 |
| 15 | −17.73580 | 0.580 | | |
| 16 | 164.25602 | 1.240 | 1.84667 | 23.79 |
| 17 | 29.27900 | 4.500 | 1.61800 | 63.40 |
| 18 | −29.27900 | 1.040 | | |
| 19 | 46.98786 | 4.460 | 1.80401 | 46.57 |
| 20 | −75.82447 | DD[20] | | |
| 21 | ∞ | 1.000 | 1.51680 | 64.20 |
| 22 | ∞ | 11.205 | | |

TABLE 9

| Example 3 | |
|---|---|
| f | 16.430 |
| Bf | 21.865 |
| FNo. | 1.84 |

TABLE 9-continued

| Example 3 | | |
|---|---|---|
| 2ω(°) | | 60.0 |
| Y | | 9.20 |
| CRA(°) | | 5.1 |

TABLE 10

| Example 3 | | |
|---|---|---|
| | Infinity | 0.1 m |
| DD[10] | 7.690 | 5.162 |
| DD[20] | 10.000 | 12.528 |

EXAMPLE 4

Figure 4:
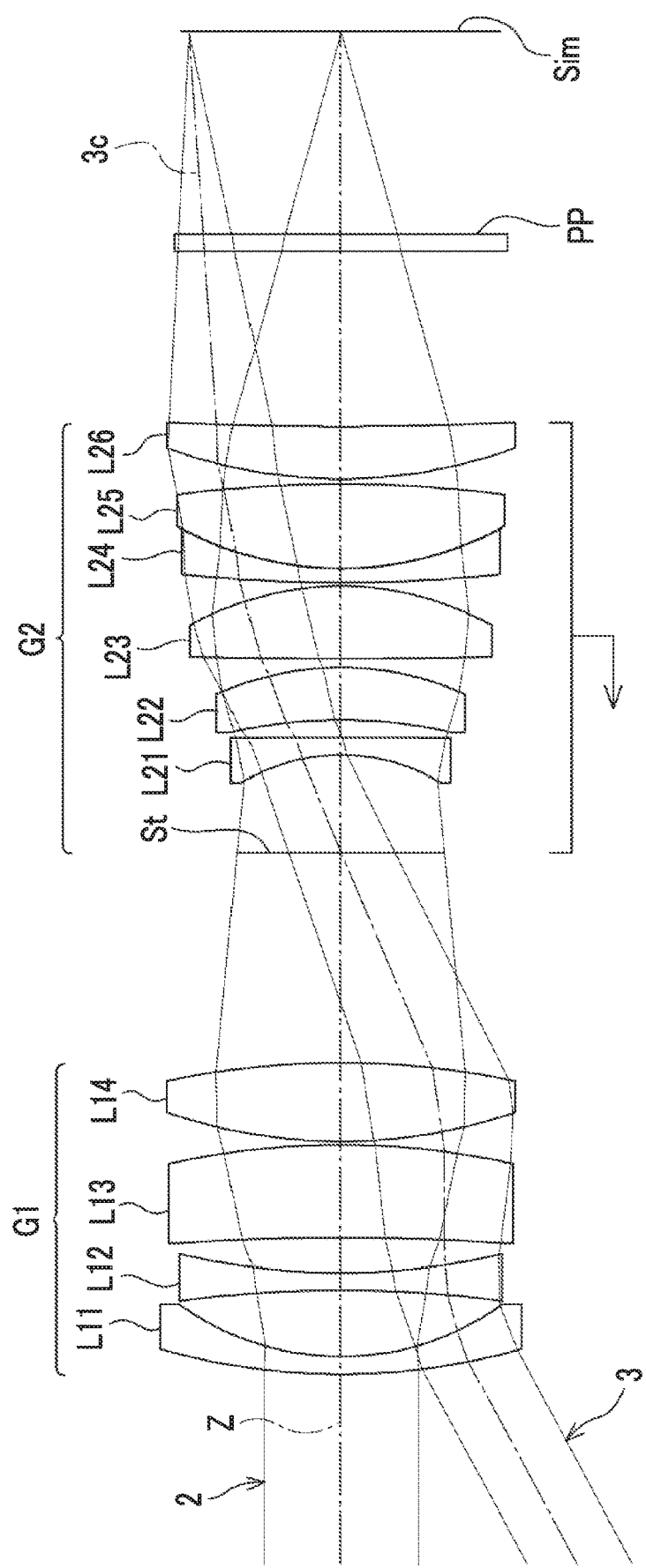
FIG. 4 is a cross-sectional view illustrating a configuration of an imaging lens of Example 4 of the present invention.
Figure 11:
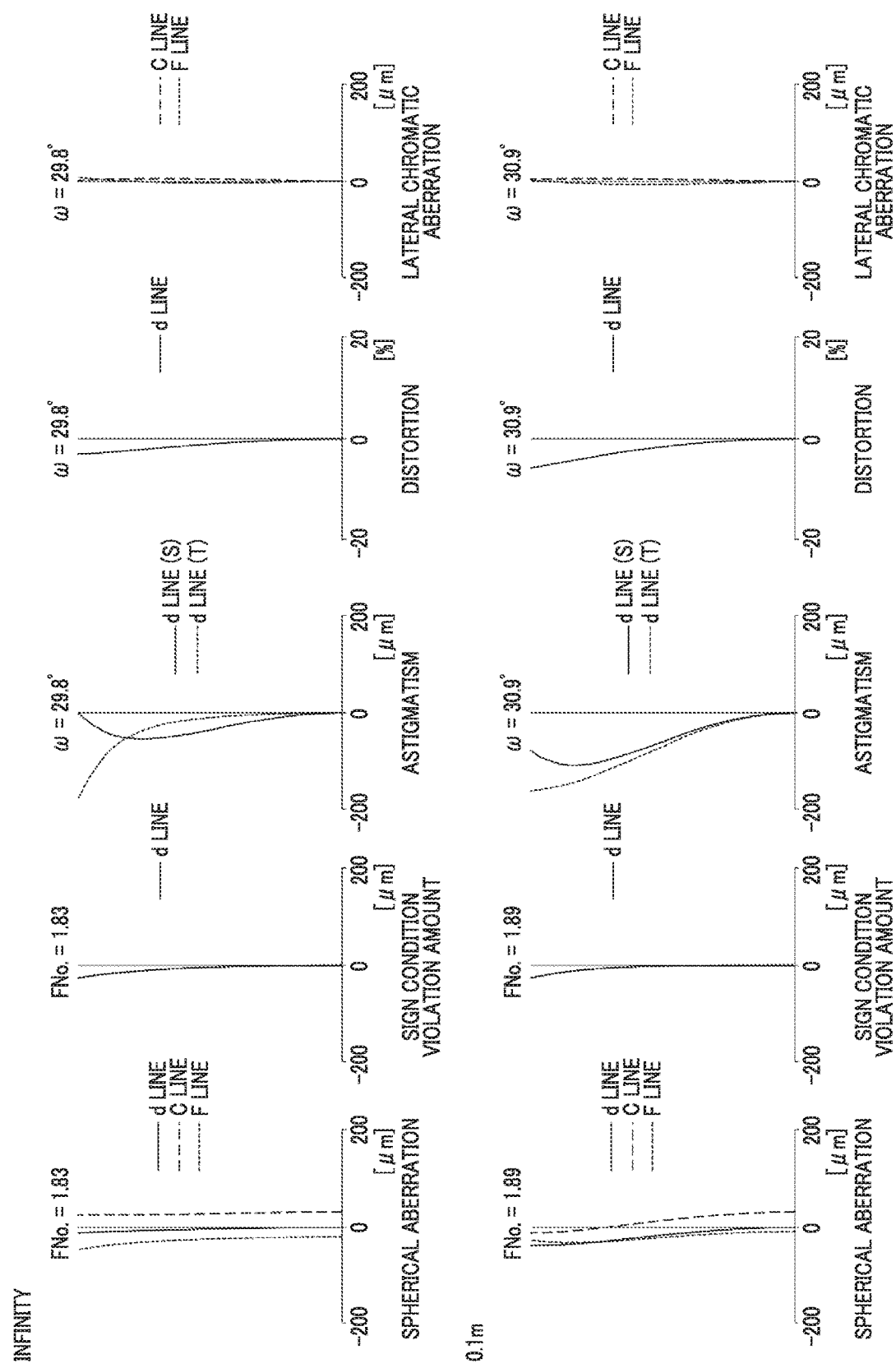
FIG. 11 is aberration diagrams of the imaging lens of Example 4 of the present invention.

FIG. 4 is a cross-sectional view illustrating a configuration of an imaging lens of Example 4. The imaging lens of Example 4 has the same configuration as the outline of the imaging lens of Example 1 except that the first lens group G1 consists of four lenses L11 to L14 in order from the object side to the image side, and the second lens group G2 consists of the aperture stop St and six lenses L21 to L26 in order from the object side to the image side. Regarding the imaging lens of Example 4, Table 11 shows basic lens data, Table 12 shows specifications, Table 13 shows variable surface distances, and FIG. 11 shows each aberration diagram. In FIG. 11, aberration diagrams in a state of focusing on the object at infinity are shown in the upper row, and aberration diagrams in a state of focusing on an object at an object distance of 0.1 m (meter) are shown in the lower row.

TABLE 11

| Example 4 | | | | |
|---|---|---|---|---|
| Sn | R | D | Nd | νd |
| 1 | 38.73034 | 1.000 | 2.00100 | 29.13 |
| 2 | 16.15654 | 3.787 | | |
| 3 | −74.11989 | 1.000 | 1.92286 | 18.90 |
| 4 | 41.06008 | 2.000 | | |
| 5 | −139.66763 | 5.301 | 1.95906 | 17.47 |
| 6 | −46.85745 | 0.200 | | |
| 7 | 31.30068 | 4.500 | 1.90366 | 31.31 |
| 8 | −49.17896 | DD[8] | | |
| 9 (St) | ∞ | 5.488 | | |
| 10 | −11.36869 | 1.000 | 1.80518 | 25.42 |
| 11 | −447.52834 | 0.994 | | |
| 12 | −29.37504 | 3.000 | 1.92286 | 18.90 |
| 13 | −17.74610 | 0.500 | | |
| 14 | 337.20842 | 4.166 | 1.62041 | 60.29 |
| 15 | −18.17366 | 0.200 | | |
| 16 | 91.60346 | 0.800 | 1.80809 | 22.76 |
| 17 | 19.91817 | 4.798 | 1.49700 | 81.54 |
| 18 | −75.09727 | 0.300 | | |
| 19 | 29.58958 | 3.000 | 1.77250 | 49.60 |
| 20 | 217.20301 | DD[20] | | |
| 21 | ∞ | 1.000 | 1.51680 | 64.20 |
| 22 | ∞ | 11.586 | | |

TABLE 12

| Example 4 | |
|---|---|
| f | 16.577 |
| Bf | 22.245 |
| FNo. | 1.83 |

TABLE 12-continued

| Example 4 | |
|---|---|
| 2ω(°) | 59.6 |
| Y | 9.20 |
| CRA(°) | 4.2 |

TABLE 13

| Example 4 | | |
|---|---|---|
| | Infinity | 0.1 m |
| DD[8] | 12.026 | 9.419 |
| DD[20] | 10.000 | 12.607 |

EXAMPLE 5

Figure 5:
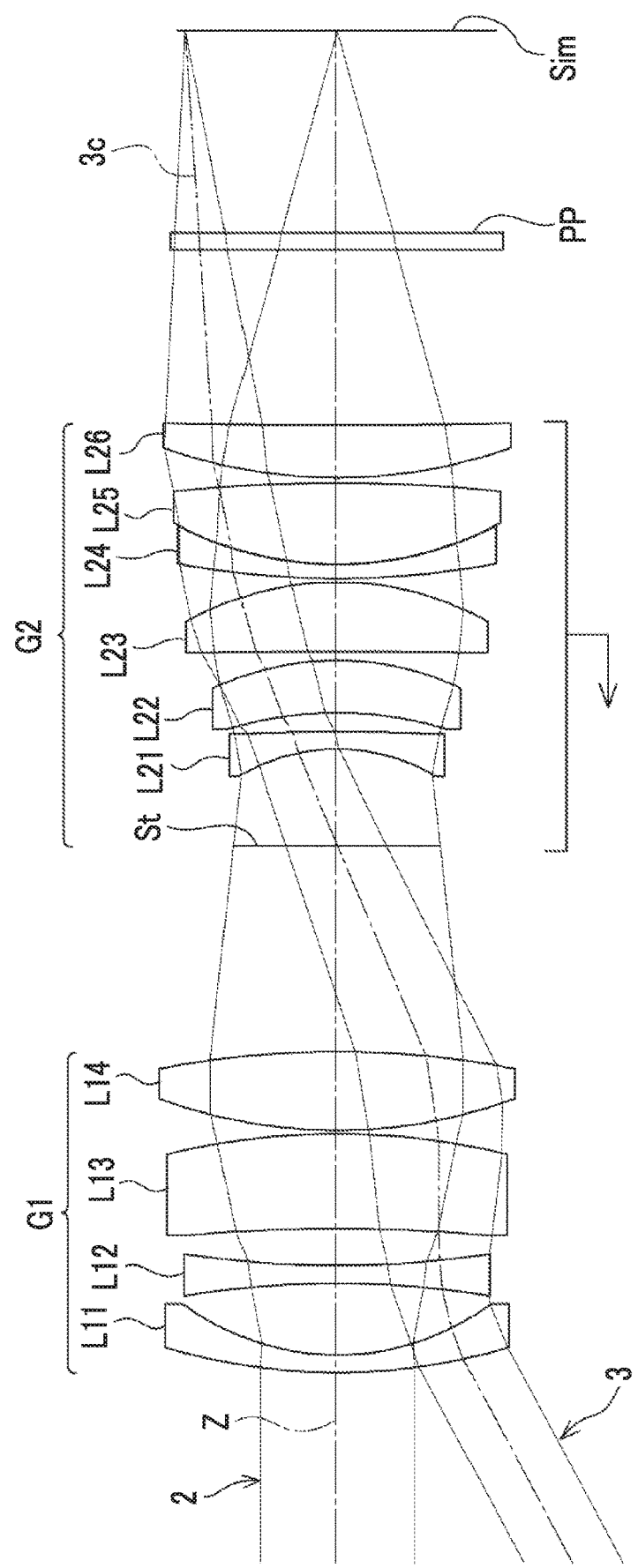
FIG. 5 is a cross-sectional view illustrating a configuration of an imaging lens of Example 5 of the present invention.
Figure 12:
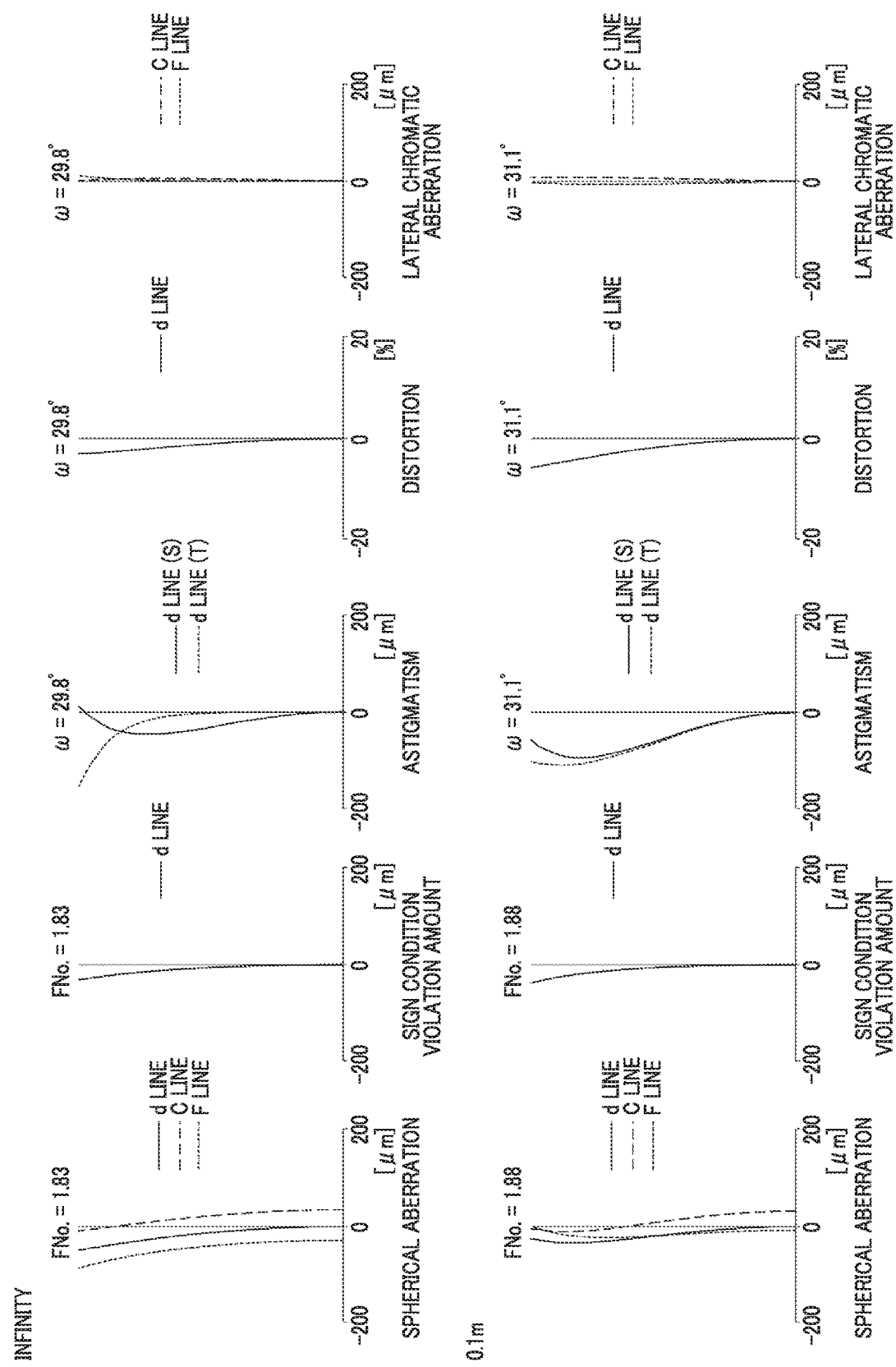
FIG. 12 is aberration diagrams of the imaging lens of Example 5 of the present invention.

FIG. 5 is a cross-sectional view illustrating a configuration of an imaging lens of Example 5. The imaging lens of Example 5 has the same configuration as the outline of the imaging lens of Example 1 except that the first lens group G1 consists of four lenses L11 to L14 in order from the object side to the image side, and the second lens group G2 consists of the aperture stop St and six lenses L21 to L26 in order from the object side to the image side. Regarding the imaging lens of Example 5, Table 14 shows basic lens data, Table 15 shows specifications, Table 16 shows variable surface distances, and FIG. 12 shows each aberration diagram. In FIG. 12, aberration diagrams in a state of focusing on the object at infinity are shown in the upper row, and aberration diagrams in a state of focusing on an object at an object distance of 0.1 m (meter) are shown in the lower row.

TABLE 14

| Example 5 | | | | |
|---|---|---|---|---|
| Sn | R | D | Nd | νd |
| 1 | 35.49875 | 1.000 | 2.00100 | 29.13 |
| 2 | 15.15187 | 4.100 | | |
| 3 | −54.61965 | 1.000 | 1.92286 | 18.90 |
| 4 | 61.19695 | 2.088 | | |
| 5 | −103.86840 | 5.438 | 1.95906 | 17.47 |
| 6 | −42.00037 | 0.200 | | |
| 7 | 30.28736 | 4.500 | 1.90366 | 31.31 |
| 8 | −54.59497 | DD[8] | | |
| 9 (St) | ∞ | 5.437 | | |
| 10 | −11.51107 | 1.000 | 1.80518 | 25.42 |
| 11 | −133.17872 | 1.086 | | |
| 12 | −22.18152 | 3.000 | 1.88300 | 40.76 |
| 13 | −17.08487 | 0.500 | | |
| 14 | −547.28017 | 3.984 | 1.62041 | 60.29 |
| 15 | −18.03807 | 0.200 | | |
| 16 | 50.39011 | 0.800 | 1.91650 | 31.60 |
| 17 | 20.21356 | 4.638 | 1.49700 | 81.54 |
| 18 | −93.26305 | 0.300 | | |
| 19 | 30.46261 | 3.000 | 1.77250 | 49.60 |
| 20 | 427.32099 | DD[20] | | |
| 21 | ∞ | 1.000 | 1.51680 | 64.20 |
| 22 | ∞ | 11.567 | | |

TABLE 15

| Example 5 | |
|---|---|
| f | 16.569 |
| Bf | 22.226 |
| FNo. | 1.83 |

TABLE 15-continued

| Example 5 | |
|---|---|
| 2ω(°) | 59.6 |
| Y | 9.20 |
| CRA(°) | 4.0 |

TABLE 16

| Example 5 | | |
|---|---|---|
| | Infinity | 0.1 m |
| DD[8] | 11.758 | 9.097 |
| DD[20] | 10.000 | 12.661 |

EXAMPLE 6

Figure 6:
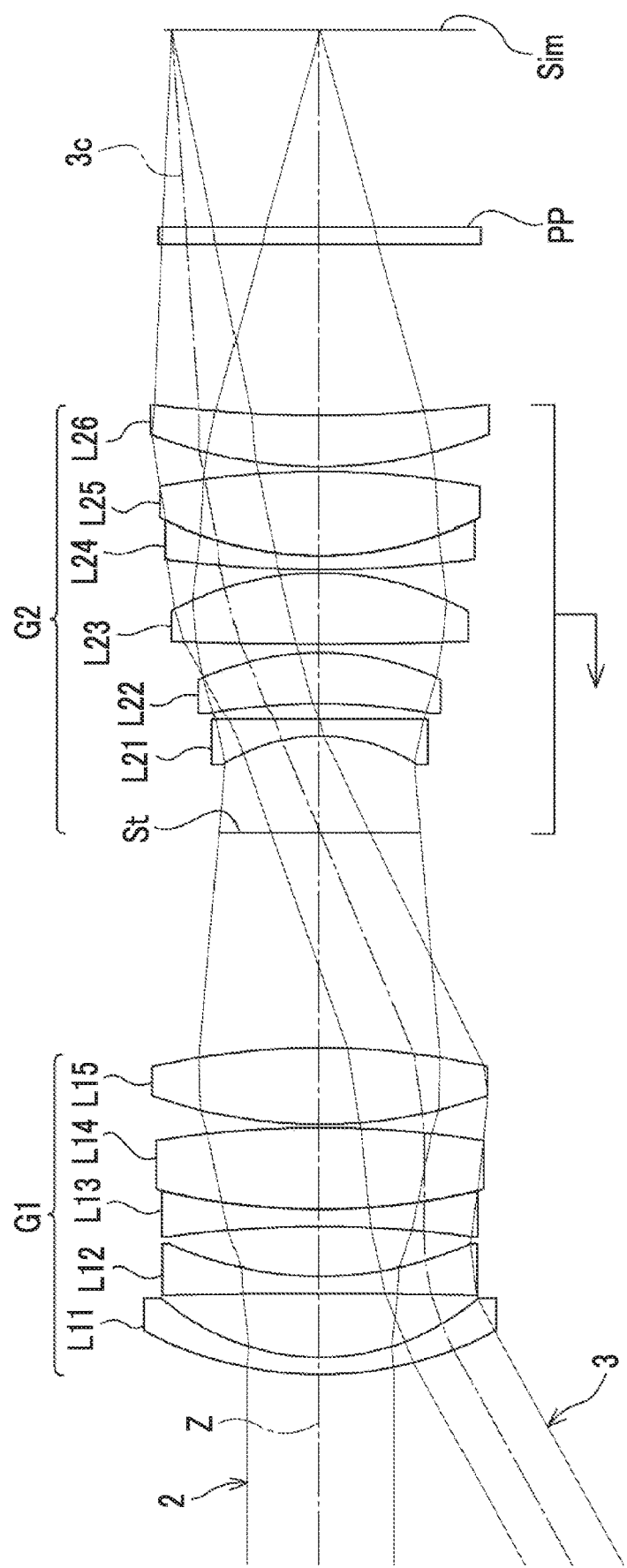
FIG. 6 is a cross-sectional view illustrating a configuration of an imaging lens of Example 6 of the present invention.
Figure 13:
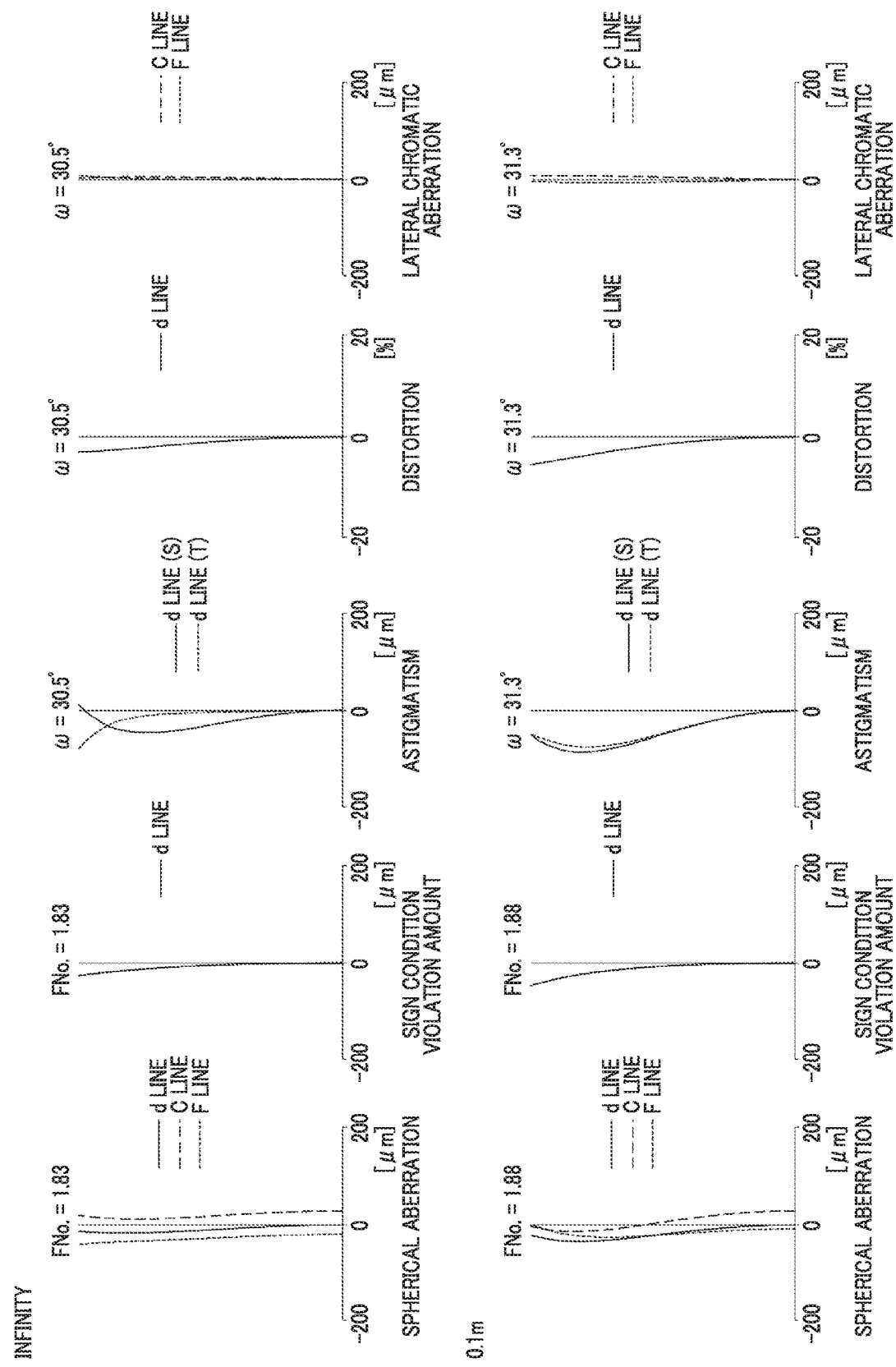
FIG. 13 is aberration diagrams of the imaging lens of Example 6 of the present invention.

FIG. 6 is a cross-sectional view illustrating a configuration of an imaging lens of Example 6. The imaging lens of Example 6 has the same configuration as the outline of the imaging lens of Example 1 except that the first lens group G1 consists of five lenses L11 to L15 in order from the object side to the image side, and the second lens group G2 consists of the aperture stop St and six lenses L21 to L26 in order from the object side to the image side. Regarding the imaging lens of Example 6, Table 17 shows basic lens data, Table 18 shows specifications, Table 19 shows variable surface distances, and FIG. 13 shows each aberration diagram. In FIG. 13, aberration diagrams in a state of focusing on the object at infinity are shown in the upper row, and aberration diagrams in a state of focusing on an object at an object distance of 0.1 m (meter) are shown in the lower row.

TABLE 17

| Example 6 | | | | |
|---|---|---|---|---|
| Sn | R | D | Nd | νd |
| 1 | 22.73167 | 1.000 | 2.00100 | 29.13 |
| 2 | 14.49563 | 3.746 | | |
| 3 | −444.18784 | 1.000 | 1.92286 | 18.90 |
| 4 | 22.27688 | 2.898 | | |
| 5 | −68.22033 | 1.000 | 1.84666 | 23.78 |
| 6 | 41.16228 | 4.784 | 1.95906 | 17.47 |
| 7 | −63.84512 | 0.200 | | |
| 8 | 30.29153 | 4.500 | 1.90366 | 31.34 |
| 9 | −44.87200 | DD[9] | | |
| 10 | ∞ | 5.585 | | |
| 11 (St) | −10.86889 | 1.000 | 1.78470 | 26.29 |
| 12 | −2227.17791 | 0.895 | | |
| 13 | −39.58728 | 3.000 | 1.72916 | 54.68 |
| 14 | −16.88509 | 0.500 | | |
| 15 | 293.76040 | 4.170 | 1.65160 | 58.55 |
| 16 | −18.63663 | 0.200 | | |
| 17 | 72.55738 | 0.800 | 1.90043 | 37.37 |
| 18 | 21.44585 | 4.909 | 1.49700 | 81.54 |
| 19 | −52.38429 | 0.300 | | |
| 20 | 27.68690 | 3.000 | 1.78590 | 44.20 |
| 21 | 77.72216 | DD[21] | | |
| 22 | ∞ | 1.000 | 1.51680 | 64.20 |
| 23 | ∞ | 11.568 | | |

TABLE 18

| Example 6 | |
|---|---|
| f | 16.125 |
| Bf | 22.227 |

TABLE 18-continued

| Example 6 | |
|---|---|
| FNo. | 1.83 |
| 2ω(°) | 61.0 |
| Y | 9.20 |
| CRA(°) | 4.3 |

TABLE 19

| Example 6 | | |
|---|---|---|
| | Infinity | 0.1 m |
| DD[9] | 12.577 | 10.173 |
| DD[21] | 10.000 | 12.404 |

EXAMPLE 7

Figure 7:
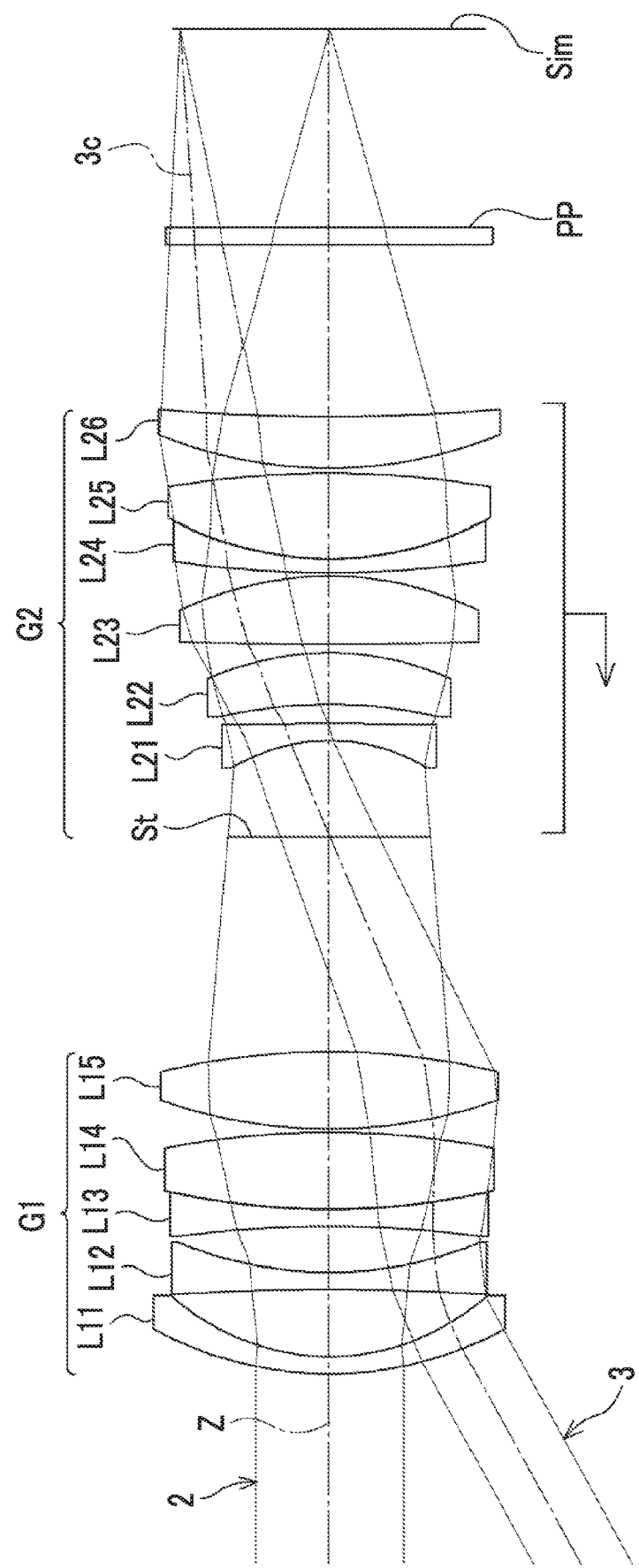
FIG. 7 is a cross-sectional view illustrating a configuration of an imaging lens of Example 7 of the present invention.
Figure 14:
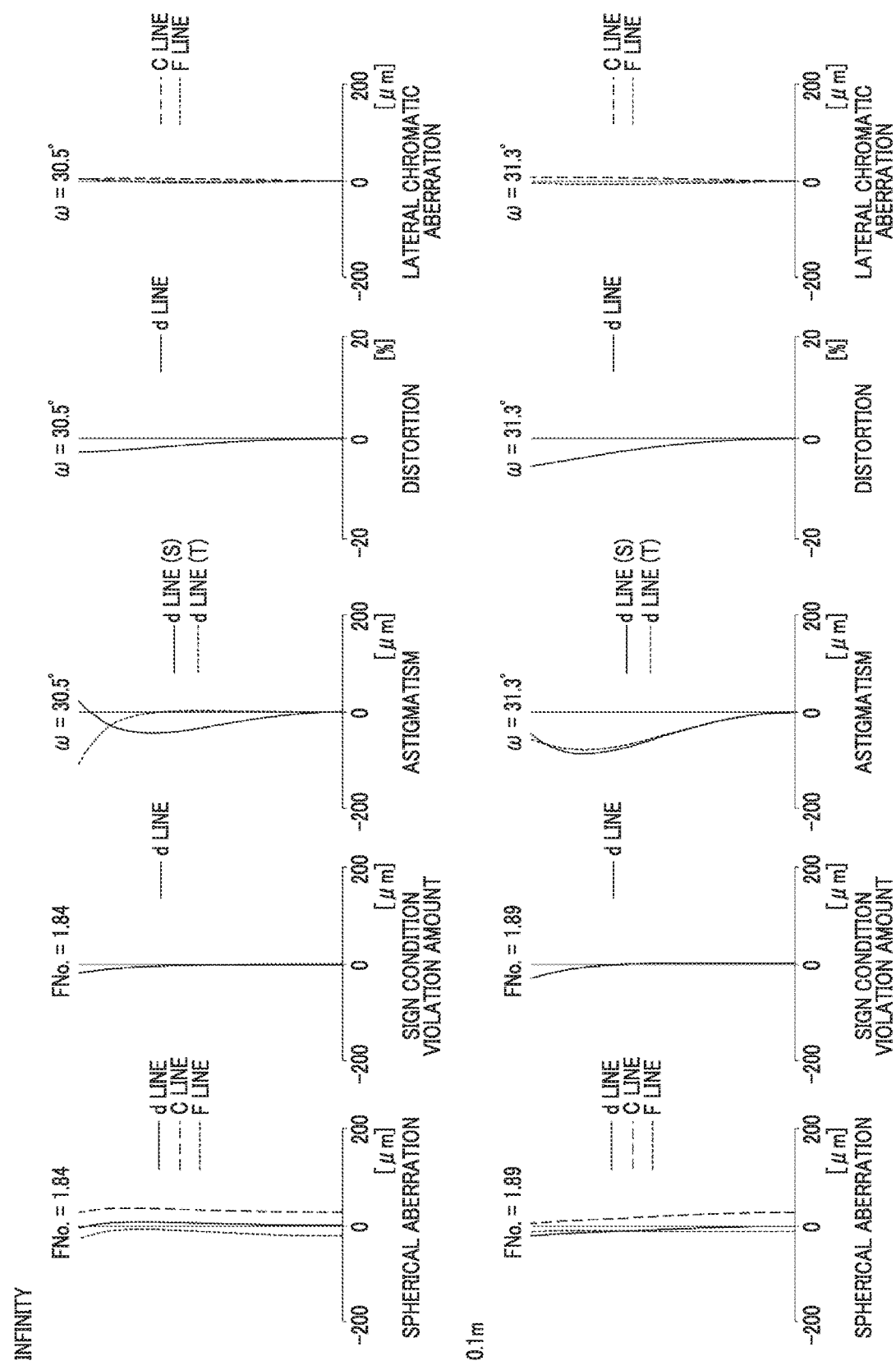
FIG. 14 is aberration diagrams of the imaging lens of Example 7 of the present invention.

FIG. 7 is a cross-sectional view illustrating a configuration of an imaging lens of Example 7. The imaging lens of Example 7 has the same configuration as the outline of the imaging lens of Example 1 except that the first lens group G1 consists of five lenses L11 to L15 in order from the object side to the image side, and the second lens group G2 consists of the aperture stop St and six lenses L21 to L26 in order from the object side to the image side. Regarding the imaging lens of Example 7, Table 20 shows basic lens data, Table 21 shows specifications, Table 22 shows variable surface distances, and FIG. 14 shows each aberration diagram. In FIG. 14, aberration diagrams in a state of focusing on the object at infinity are shown in the upper row, and aberration diagrams in a state of focusing on an object at an object distance of 0.1 m (meter) are shown in the lower row.

TABLE 20

| Example 7 | | | | |
|---|---|---|---|---|
| Sn | R | D | Nd | νd |
| 1 | 21.97293 | 1.000 | 2.00100 | 29.13 |
| 2 | 14.02973 | 3.905 | | |
| 3 | −148.00786 | 1.000 | 1.92286 | 18.90 |
| 4 | 24.08655 | 2.651 | | |

TABLE 20-continued

| Example 7 | | | | |
|---|---|---|---|---|
| Sn | R | D | Nd | νd |
| 5 | −68.59570 | 1.000 | 1.90366 | 31.31 |
| 6 | 44.52832 | 4.479 | 1.95906 | 17.47 |
| 7 | −51.91903 | 0.200 | | |
| 8 | 30.32147 | 4.500 | 1.88300 | 40.76 |
| 9 | −42.27466 | DD[9] | | |
| 10 | ∞ | 5.505 | | |
| 11 (St) | −11.38487 | 1.000 | 1.75520 | 27.51 |
| 12 | −312.69680 | 1.122 | | |
| 13 | −29.29837 | 3.000 | 1.75500 | 52.32 |
| 14 | −17.66877 | 0.500 | | |
| 15 | 327.34593 | 3.975 | 1.71299 | 53.87 |
| 16 | −20.35729 | 0.200 | | |
| 17 | 65.83732 | 0.800 | 1.90525 | 35.04 |
| 18 | 20.26902 | 4.960 | 1.49700 | 81.54 |
| 19 | −57.19295 | 0.300 | | |
| 20 | 27.01366 | 3.000 | 1.69680 | 55.53 |
| 21 | 120.28671 | DD[21] | | |
| 22 | ∞ | 1.000 | 1.51680 | 64.20 |
| 23 | ∞ | 11.571 | | |

TABLE 21

| Example 7 | |
|---|---|
| f | 16.127 |
| Bf | 22.230 |
| FNo. | 1.84 |
| 2ω(°) | 61.0 |
| Y | 9.20 |
| CRA(°) | 4.0 |

TABLE 22

| Example 7 | | |
|---|---|---|
| | Infinity | 0.1 m |
| DD[9] | 12.499 | 10.092 |
| DD[21] | 10.000 | 12.407 |

Table 23 shows values corresponding to Conditional Expressions (1) to (8) of the imaging lenses of Examples 1 to 7. In Examples 1 to 7, the d line is set as the reference wavelength. Table 23 shows the values based on the d line.

TABLE 23

| Expression Number | | Example 1 | Example 2 | Example 3 | Example 4 |
|---|---|---|---|---|---|
| (1) | dH12/f1 | −1.003 | −0.174 | 0.056 | 0.050 |
| (2) | dSt/f2 | −0.759 | −0.748 | −0.737 | −0.765 |
| (3) | f2/fp | 0.694 | 0.708 | 0.652 | 0.536 |
| (4) | f/f1 | 0.263 | 0.402 | 0.351 | 0.333 |
| (5) | dG1/f1 | 1.179 | 1.235 | 0.813 | 0.599 |
| (6) | (n11 + n12)/2 | 1.932285 | 1.8119 | 1.669495 | 1.9619315 |
| (7) | n21 | 1.95375 | 1.84666 | 1.69894 | 1.805181 |
| (8) | (rf − rr)/(rf + rr) | −0.314 | 0.075 | 2.170 | 0.624 |
| Expression Number | | Example 5 | Example 6 | Example 7 | |
| (1) | dH12/f1 | 0.102 | −0.027 | −0.022 | |
| (2) | dSt/f2 | −0.769 | −0.760 | −0.766 | |
| (3) | f2/fp | 0.562 | 0.439 | 0.473 | |
| (4) | f/f1 | 0.374 | 0.292 | 0.293 | |

TABLE 23-continued

| (5) | dG1/f1 | 0.680 | 0.574 | 0.568 |
|---|---|---|---|---|
| (6) | (n11 + n12)/2 | 1.9619315 | 1.9619315 | 1.9619315 |
| (7) | n21 | 1.805181 | 1.784696 | 1.755199 |
| (8) | (rf − rr)/(rf + rr) | 0.652 | 0.610 | 0.576 |

As can be seen from the above data, the imaging lenses of Examples 1 to 7 are the rear-focusing type lens system that has a configuration capable of achieving miniaturization, suppressing a variation of field curvature during focusing, having a small incidence angle of the principal light ray of the maximum image height on the image plane Sim, which is 6 degrees or less, and realizing high optical performance by favorably correcting various aberrations.

Figure 15:
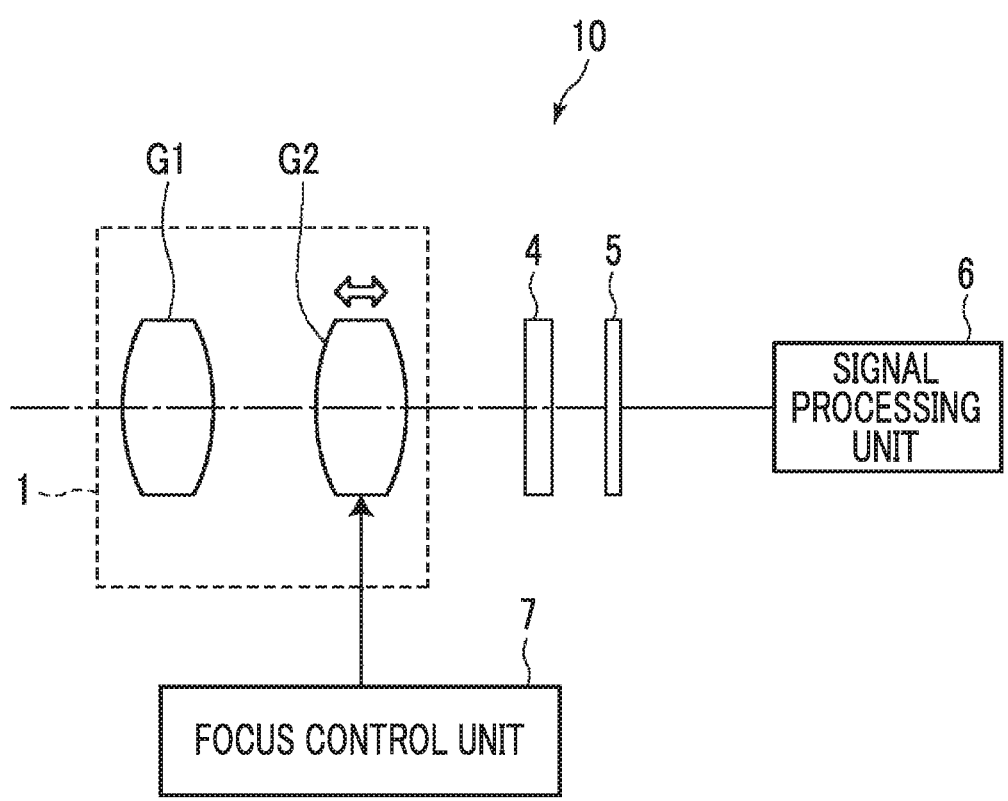
FIG. 15 is an outline block diagram of the imaging apparatus according to the embodiment of the present invention.

Next, an embodiment of an imaging apparatus according to the present invention is described. FIG. 15 shows an outline block diagram of an imaging apparatus 10 using an imaging lens 1 according to the embodiment of the present invention as an example of an imaging apparatus according to an embodiment of the present invention. As the imaging apparatus 10, for example, a camera for FA, a camera for MV, or a camera for monitoring can be mentioned.

The imaging apparatus 10 comprises an imaging lens 1, a filter 4 disposed on the image side of the imaging lens 1, an imaging element 5, a signal processing unit 6 which performs arithmetic processing on an output signal from the imaging element 5, and a focus control unit 7 for focusing of the imaging lens 1. In FIG. 15, the first lens group G1 and the second lens group G2 included in the imaging lens 1 are conceptually illustrated. The imaging element 5 captures an image of a subject, which is formed by the imaging lens 1 to convert the image into an electrical signal. For example, a charge coupled device (CCD), a complementary metal oxide semiconductor (CMOS), or the like can be used as the imaging element 5. The imaging element 5 is disposed such that the imaging surface of the imaging element 5 coincides with the image plane Sim of the imaging lens 1.

The present invention has been hitherto described through embodiments and examples, but the present invention is not limited to the above-mentioned embodiments and examples, and may be modified into various forms. For example, values of the radius of curvature, the surface distance, the refractive index, the Abbe number, and the aspherical coefficient of each lens are not limited to the values shown in the numerical examples, and different values may be used therefor.

The imaging apparatus according to the embodiment of the present invention is not also limited to the above-described examples. For the imaging apparatus, various aspects such as digital cameras and in-vehicle cameras can be employed.

What is claimed is:

1. An imaging lens consisting of, in order from an object side to an image side:
a first lens group having a positive refractive power, which is fixed with respect to an image plane during focusing; and
a second lens group having a positive refractive power, which moves along an optical axis during focusing,
wherein the first lens group comprises two negative lenses in consecutive order from the most object side to the image side,
the second lens group consists of a stop, two negative lenses, and three or four positive lenses,
the stop is disposed on the most object side of the second lens group,
a lens on the most object side of the second lens group is a negative lens,
a lens on the most image side of the second lens group is a positive lens, and
in a case where, in a state of focusing on the object at infinity, a distance from an image side principal point of the first lens group, as a reference, to an object side principal point of the second lens group is dH12, a focal length of the first lens group is f1, a distance in an optical axis direction from the object side principal point of the second lens group, as a reference, to the stop is dSt, a focal length of the second lens group is f2, a focal length of the positive lens on the most image side is fp, and regarding dH12 and dSt, each sign of a distance from the reference to the image side is positive and each sign of a distance from the reference to the object side is negative, Conditional Expressions (1), (2) and (3) are satisfied, which are represented by $$-2 < dH12/f1 < 0.5 \tag{1}$$

$$-1 < dSt/f2 < -0.6 \tag{2}$$

$$0.4 < f2/fp < 0.8 \tag{3}.$$

2. The imaging lens according to claim 1,
wherein, in a case where a focal length of the imaging lens in a state of focusing on the object at infinity is f, Conditional Expression (4) is satisfied, which is represented by $$0 < f/f1 < 0.5 \tag{4}.$$

3. The imaging lens according to claim 1,
wherein, in a case where a distance on the optical axis from a lens surface on the most object side of the first lens group to a lens surface on the most image side of the first lens group is dG1, Conditional Expression (5) is satisfied, which is represented by $$0.5 < dG1/f1 < 1.5 \tag{5}.$$

4. The imaging lens according to claim 1,
wherein the number of lenses configuring the first lens group is four or more and six or less.

5. The imaging lens according to claim 1,
wherein, in a case where a refractive index of the negative lens on the most object side of the first lens group with respect to d line is n11 and a refractive index of a second negative lens from the object side of the first lens group with respect to d line is n12, Conditional Expression (6) is satisfied, which is represented by $$1.6 < (n11+n12)/2 < 2 \tag{6}.$$

6. The imaging lens according to claim 1,
wherein, in a case where a refractive index of the negative lens on the most object side of the second lens group with respect to d line is n21, Conditional Expression (7) is satisfied, which is represented by $$1.6 < n21 < 2 \tag{7}.$$

7. The imaging lens according to claim 1,
wherein, in a case where a radius of curvature of a lens surface on the most image side of the first lens group is rf and a radius of curvature of a lens surface on the most object side of the second lens group is rr, Conditional Expression (8) is satisfied, which is represented by $$-0.5<(rf-rr)/(rf+rr)<2.5 \qquad (8).$$

8. The imaging lens according to claim 1,
wherein Conditional Expression (1-1) is satisfied, which is represented by $$-1.5<dH12/f1<0.2 \qquad (1\text{-}1).$$

9. The imaging lens according to claim 1,
wherein Conditional Expression (2-1) is satisfied, which is represented by $$-0.8<dSt/f2<-0.7 \qquad (2\text{-}1).$$

10. The imaging lens according to claim 1,
wherein Conditional Expression (3-1) is satisfied, which is represented by $$0.42<f2/fp<0.72 \qquad (3\text{-}1).$$

11. The imaging lens according to claim 2,
wherein Conditional Expression (4-1) is satisfied, which is represented by $$0.25<f/f1<0.45 \qquad (4\text{-}1).$$

12. The imaging lens according to claim 3,
wherein Conditional Expression (5-1) is satisfied, which is represented by $$0.55<dG1/f1<1.3 \qquad (5\text{-}1).$$

13. The imaging lens according to claim 5,
wherein Conditional Expression (6-1) is satisfied, which is represented by $$1.65<(n11+n12)/2<1.98 \qquad (6\text{-}1).$$

14. The imaging lens according to claim 6,
wherein Conditional Expression (7-1) is satisfied, which is represented by $$1.65<n21<1.96 \qquad (7\text{-}1).$$

15. The imaging lens according to claim 7,
wherein Conditional Expression (8-1) is satisfied, which is represented by $$-0.4<(rf-rr)/(rf+rr)<2.2 \qquad (8\text{-}1).$$

16. An imaging apparatus comprising the imaging lens according to claim 1.

* * * * *